United States Patent
Shibata et al.

(10) Patent No.: US 9,783,192 B2
(45) Date of Patent: Oct. 10, 2017

(54) CONTROL SYSTEM FOR VEHICLE

(71) Applicant: TOYOTA JIDOSHA KABUSHIKI KAISHA, Toyota-shi (JP)

(72) Inventors: Hiroyuki Shibata, Odawara (JP); Hiroyuki Shioiri, Yokohama (JP); Hideaki Komada, Gotemba (JP); Yuki Kurosaki, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/305,561

(22) PCT Filed: Apr. 22, 2015

(86) PCT No.: PCT/IB2015/000555
§ 371 (c)(1),
(2) Date: Oct. 20, 2016

(87) PCT Pub. No.: WO2015/162487
PCT Pub. Date: Oct. 29, 2015

(65) Prior Publication Data
US 2017/0113676 A1    Apr. 27, 2017

(30) Foreign Application Priority Data
Apr. 25, 2014   (JP) .................................. 2014-090867

(51) Int. Cl.
*F16D 41/12* (2006.01)
*F16D 41/14* (2006.01)
(Continued)

(52) U.S. Cl.
CPC ............. *B60W 20/40* (2013.01); *B60K 6/383* (2013.01); *B60K 6/387* (2013.01); *B60K 6/442* (2013.01);
(Continued)

(58) Field of Classification Search
CPC ...... B60W 20/40; B60W 20/15; B60W 10/02; B60K 6/383; B60K 6/387; B60K 6/445;
(Continued)

(56) References Cited

U.S. PATENT DOCUMENTS 8,418,825 B2 *   4/2013   Bird ..................... F16D 41/125
                                                        192/46
2008/0223681 A1   9/2008   Stevenson et al.
(Continued)

FOREIGN PATENT DOCUMENTS

JP   2015-189323 A   11/2015
JP   2015-209053 A   11/2015
(Continued)

OTHER PUBLICATIONS

International Search Report issued Jul. 17, 2015 in PCT/IB2015/000555, dated Apr. 22, 2015.

*Primary Examiner* — Michael J Zanelli
(74) *Attorney, Agent, or Firm* — Oblon, McClelland, Maier & Neustadt, L.L.P.

(57) ABSTRACT

A control system, for a vehicle (Ve), comprises an electronic control unit (18) and a selectable one-way clutch (17). The electronic control unit (18) is configured to produce differential rotation in the selectable one-way clutch (17) by controlling the rotational speed by a motor (2), the differential rotation including positive differential rotation and negative differential rotation, the positive differential rotation being the relative rotation in a direction in which the relative rotation is restricted in an engaged state of the selectable one-way clutch (17), and the negative differential rotation being the relative rotation in a direction in which the relative rotation is permitted in an engaged state of the selectable one-way clutch (17), wherein the electronic control unit (1.) sets a first state of the selectable one-way clutch (17), and (2.) executes lock rotation control in which the
(Continued)

differential rotation is maintained at positive differential rotation, in the case where the control unit (18) switches the selectable one-way clutch (17) from the disengaged state to the engaged state.

12 Claims, 10 Drawing Sheets

(51) Int. Cl.
| | |
|---|---|
| *B60W 10/02* | (2006.01) |
| *B60W 20/00* | (2016.01) |
| *B60K 6/383* | (2007.10) |
| *B60K 6/387* | (2007.10) |
| *B60K 6/445* | (2007.10) |
| *B60W 20/40* | (2016.01) |
| *B60W 10/08* | (2006.01) |
| *B60W 20/15* | (2016.01) |
| *B60W 10/06* | (2006.01) |
| *B60K 6/442* | (2007.10) |
| *F16H 3/72* | (2006.01) |
| *F16H 37/08* | (2006.01) |
| *F16H 48/10* | (2012.01) |

(52) U.S. Cl.
CPC ............. *B60K 6/445* (2013.01); *B60W 10/02* (2013.01); *B60W 10/06* (2013.01); *B60W 10/08* (2013.01); *B60W 20/15* (2016.01); *F16H 3/724* (2013.01); *F16H 37/0806* (2013.01); *F16H 48/10* (2013.01); *B60Y 2200/92* (2013.01); *B60Y 2300/42* (2013.01); *B60Y 2300/428* (2013.01); *B60Y 2400/427* (2013.01); *Y10S 903/946* (2013.01)

(58) Field of Classification Search
CPC ...... F16H 48/10; F16H 37/08; Y10S 903/946; B60Y 2400/427; B60Y 2200/92
See application file for complete search history.

(56) References Cited

U.S. PATENT DOCUMENTS

| | | |
|---|---|---|
| 2009/0084653 A1 | 4/2009 | Holmes |
| 2013/0062151 A1 | 3/2013 | Pawley |
| 2017/0138414 A1* | 5/2017 | Cioc .................. F16D 27/09 |

FOREIGN PATENT DOCUMENTS

| | | |
|---|---|---|
| JP | 2015-209054 A | 11/2015 |
| WO | WO 2015/162480 A2 | 10/2015 |
| WO | WO 2015/162484 A1 | 10/2015 |

* cited by examiner

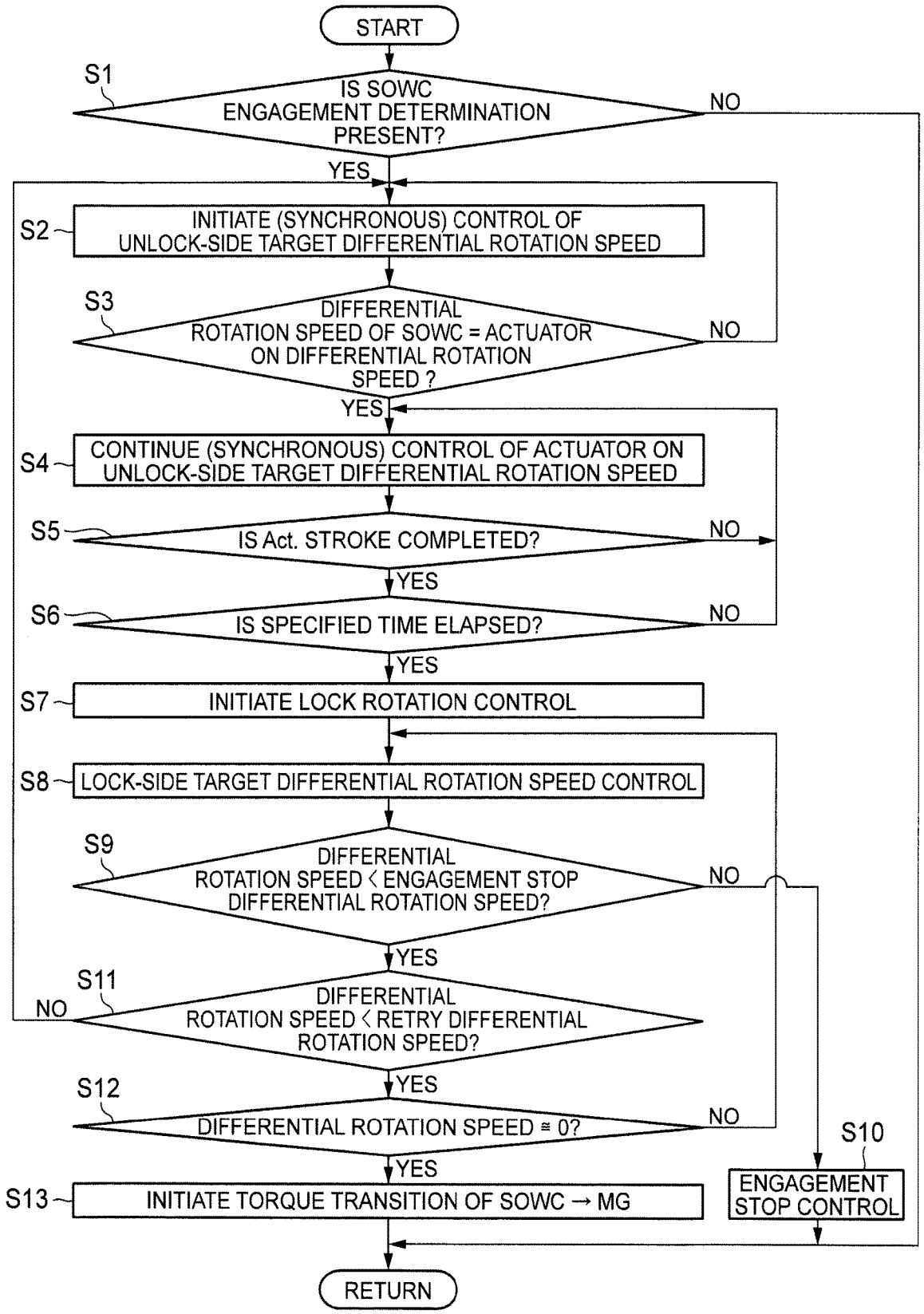

CONTROL SYSTEM FOR VEHICLE

BACKGROUND OF THE INVENTION

1. Field of the Invention

The invention relates to a system for controlling a mechanism that transmits power for a travel of a vehicle. The invention particularly relates to a control system for a power transmission mechanism that includes a selectable one-way clutch.

2. Description of Related Art

The invention related to a vehicular transmission that includes a selectable one-way clutch (hereinafter described as an SOWC) is described in US 2009/0084653 A. The SOWC described in this US 2009/0084653 A includes: a first ring and a second ring that are arranged to face each other; and a strut that is arranged between these first ring and second ring. The first ring is provided with a pocket which a tip of the strut enters and is engaged with. The second ring is provided with a through opening. The strut is housed in the through opening. The strut is configured to be pushed out to the pocket side by a projecting tooth of an apply ring via a spring, the projecting tooth of the apply ring being inserted in the through opening from a back surface side of the second ring (an opposite side of a surface that faces the first ring). A combination of the strut and the pocket is provided in two types that are a first type and a second type. In the first type, the strut and the pocket are engaged when the SOWC transmits torque in a forward travel direction. In the second type, the strut and the pocket are engaged when the SOWC transmits the torque in a reverse travel direction. A blocking device is arranged between the first ring and the second ring in a manner to rotate within a specified angle range. The blocking device is a ring-shaped plate like the first ring and the second ring. This blocking device is provided with a window through which the strut passes. In addition, a return mechanism that presses the blocking device in a direction to separate the blocking device from the first ring is provided between the blocking device and the first ring. Then, the above apply ring is configured to be moved by an actuator in a rotational axis direction. Accordingly, it is configured that the second ring and the blocking device are pressed to the first ring side via the apply ring and the projecting tooth by pressing the apply ring to the first ring side by thrust of the actuator.

In a disengaged state that the above SOWC is not engaged in any of rotational directions of the forward travel direction and the reverse travel direction, the strut is pressed in the through opening of the second ring by the blocking device. In other words, the first ring is completely separated from the blocking device and the second ring. The actuator is actuated in such a disengaged state to press the second ring and the blocking device to the first ring side. As a result, the blocking device is brought into contact with an opposing surface of the first ring. The blocking device that is in contact with the first ring rotates in a rotational direction of the first ring by a friction force that is generated at this time. Then, when a position of the window of the blocking device matches a position of the through opening of the second ring (that is, the strut) in the rotational direction, the strut is pushed out from the window to the first ring side. As a result, the tip of the strut is engaged with the pocket that is formed in the first ring. In other words, the SOWC is switched to an engaged state.

Noted that the invention related to an SOWC is described in US 2013/0062151 A. The SOWC is constructed with: a strut; a notch plate that is formed with a notch, the notch being engaged with the strut; a pocket plate that is provided with a recessed section for housing the strut; a control plate that is formed with an opening through which the strut passes and that controls an engaged state between the strut and the notch.

In the SOWC described in US 2009/0084653 A above, in the case where the SOWC is switched from a disengaged state (MODE 1) to an engaged state (MODE 2), the SOWC is controlled such that a negative difference (differential rotation) is once produced between a rotational speed of the first plate and a rotational speed of the second plate. Thereafter, the SOWC is controlled such that the differential rotation speed becomes positive. The SOWC is switched from the disengaged state to the engaged state in a state that the differential rotation speed has actually become positive. More specifically, the SOWC is controlled such that the differential rotation speed, which has once become negative, is reversed to the positive side and then increased. Then, at a point of time when the differential rotation speed becomes zero, the actuator starts being actuated. With the actuation of the actuator, the blocking device is rotated by contacting with the first ring. Then, the position of the window of the blocking device matches the position of the through opening of the second ring. Accordingly, a state that the strut can be projected from the window of the blocking device is generated. In other words, a state that the strut can be engaged with the pocket is generated. Then, once the differential rotation speed is increased to specified differential rotation speed on the positive side, the strut is operated to be projected from the window of the blocking device. The tip of the strut is then engaged with the pocket of the first ring, and thus the SOWC is switched to the engaged state. Noted that, in this SOWC, a state of the positive differential rotation corresponds to a direction in which the strut and the pocket are engaged. That is, this state corresponds to a rotational state in which the torque can be transmitted between the first ring and the second ring. A state of the negative differential rotation corresponds to a direction in which the strut and the pocket are not engaged. That is, this state corresponds to a rotational state in which the torque is not transmitted between the first ring and the second ring.

SUMMARY OF THE INVENTION

Just as described, in the SOWC described in US 2009/0084653 A, the blocking device for controlling an operation of the strut is indirectly operated, that is, operated by following an operation of any other component of the SOWC. Accordingly, the SOWC is not configured that the operation of the blocking device is actively controlled. For this reason, in the SOWC described in US 2009/0084653 A, when the strut is engaged with the pocket for switching the SOWC to the engaged state, the strut is possibly engaged with the pocket in a state that the differential rotation speed of the SOWC is excessively increased to the positive side. When the strut is engaged with the pocket in such a state of the excessively high differential rotation speed of the SOWC, inertia torque from the other rotary members is possibly applied to the strut during the engagement thereof, and thus shock or an impact force is possibly generated. As a result, durability of the SOWC is possibly degraded.

The invention provides a control device for a vehicular power transmission mechanism with which a selectable one-way clutch can appropriately be engaged.

A first aspect of the invention is a control system for a vehicle. The control system includes a selectable one-way clutch, a motor, and an electronic control unit. The selectable one-way clutch includes a first clutch member, a second clutch member, a strut, and a switching mechanism. The first clutch member and the second clutch member are configured to rotate relatively to each other. At least a part of the strut is configured to be operated such that it is projected from a first clutch member side to a second clutch member side. The switching mechanism is configured to selectively set a first state and a second state. The first state is a state that permits a projection of the strut to the second clutch member side. The second state is a state that inhibits the projection of the strut. The selectable one-way clutch is configured to be switched between an engaged state and a disengaged state. The engaged state is a state that restricts a relative rotation in either a positive rotational direction or a reverse rotational direction in the first state. In the first state, the part of the strut is projected from the first clutch member side to the second clutch member side and the part of the strut is engaged with a part of the second clutch member. The disengaged state is a state that permits the relative rotation in both of the positive rotational direction and the reverse rotational direction in the second state in which the strut is not projected to the second clutch member side. The motor is configured to control a rotational speed of a first rotary member or a second rotary member. The electronic control unit is configured to (i) produce differential rotation by controlling the rotational speed by the motor, the differential rotation including positive differential rotation and negative differential rotation, the positive differential rotation being the relative rotation in a direction in which the relative rotation is restricted in the engaged state of the selectable one-way clutch, and the negative differential rotation being the relative rotation in a direction in which the relative rotation is permitted in the disengaged state of the selectable one-way clutch, and (ii) (1) set the first state, and (2) execute lock rotation control in which the differential rotation is maintained at the positive differential rotation, in the case where the electronic control unit switches the selectable one-way clutch from the disengaged state to the engaged state.

According to the above aspect, in the case where the selectable one-way clutch is switched from the disengaged state to the engaged state, the switching mechanism is actuated such that the strut can be projected at a position which is between the two clutch members and at which the strut is engaged (the first state). Then, the differential rotation speed of the selectable one-way clutch is maintained to be positive. When the differential rotation speed is positive, torque can be transmitted between the two clutch members. Accordingly, the part of the strut is engaged with the part of the second clutch member in a state that the differential rotation speed is maintained at a specified positive value. Thus, the torque is transmitted between the two clutch members. In other words, the selectable one-way clutch is brought into the engaged state. Therefore, the selectable one-way clutch can be brought into the engaged state by engaging the part of the strut with the part of the second clutch member at desired and appropriate differential rotation speed. For example, the selectable one-way clutch is engaged in a state that the differential rotation speed is low. In this way, the inertia torque and the impact force during engagement can be suppressed. In addition, since the differential rotation speed is not increased substantially, the time required for engagement can be shortened. Therefore, the selectable one-way clutch in the disengaged state can appropriately be switched to the engaged state.

In the above aspect, the selectable one-way clutch may have a ratchet mechanism. The ratchet mechanism may be configured to be operated such that the part of the strut, which is projected to the second clutch member side, is not engaged with the part of the second clutch member when the differential rotation speed is equal to or higher than a first differential rotation speed on the positive side. The ratchet mechanism may be configured to be operated such that the part of the strut is engaged with the part of the second clutch member when the differential rotation speed is lower than the first differential rotation speed. A first target differential rotation speed may be set as a target value of the differential rotation speed that is used when the differential rotation speed is maintained to be positive in the lock rotation control. The first target differential rotation speed may be set as a value that is lower than the first differential rotation speed.

In the above aspect, in the case where the differential rotation speed of the selectable one-way clutch is maintained to be positive as described above and where the part of the strut is engaged with the part of the second clutch member, the rotation of the motor is controlled such that the differential rotation speed is maintained at the first target differential rotation speed that is set as the value on the positive side. In addition, the selectable one-way clutch is provided with the ratchet function that is operated to flick the strut when the differential rotation speed is equal to or higher than the first differential rotation speed. Then, the above first target differential rotation speed is set as a value that is lower than the first differential rotation speed. Thus, according to the above aspect, in the case where the part of the strut is engaged with the part of the second clutch member as described above, the differential rotation speed of the selectable one-way clutch can be maintained to be lower than the first differential rotation speed and at the desired appropriate value. Then, the part of the strut can be engaged with the part of the second clutch member in such a state. Therefore, the selectable one-way clutch in the disengaged state can appropriately and reliably be switched to the engaged state.

In the above aspect, the electronic control unit may be configured to (i) set the first state and execute unlock rotation control in which the differential rotation speed is once maintained to be negative, and (ii) then execute the lock rotation control, in the case where the selectable one-way clutch is switched from the disengaged state to the engaged state.

According to the above aspect, in the case where the selectable one-way clutch is switched from the disengaged state to the engaged state, the differential rotation speed of the selectable one-way clutch once becomes negative. In other words, the unlock rotation control is executed. Then, the switching mechanism is actuated such that the strut can be projected to the position which is between the two clutch members and at which the strut can be engaged (the first state) in the state that the differential rotation speed is negative. When the differential rotation speed of the selectable one-way clutch is positive, the torque can be transmitted between the two clutch members. Accordingly, a load is possibly applied to the strut. On the contrary, when the differential rotation speed is negative, the torque is not transmitted between the two clutch members. Accordingly, no load is applied to the strut, and the strut can easily be operated. Thus, by setting the first state as described above in the state that the differential rotation speed is negative, the strut can easily be operated and reliably be engaged at the specified position. Therefore, the selectable one-way clutch in the disengaged state can reliably and appropriately be switched to the engaged state.

In the above aspect, a second target differential rotation speed may be set as a target value of the differential rotation speed for once maintaining the differential rotation speed to be negative in the unlock rotation control. The electronic control unit may be configured to control the motor such that the differential rotation speed is maintained at the second target differential rotation speed until the first state is set and the part of the strut is projected to the second clutch member side.

According to the above aspect, in the case where the selectable one-way clutch is switched from the disengaged state to the engaged state, the differential rotation speed of the selectable one-way clutch once becomes negative. In other words, the unlock rotation control is executed. In this case, the rotation of the motor is controlled such that the differential rotation speed is maintained at the second target differential rotation speed that is set as the value on the negative side. When the differential rotation speed is controlled, control disturbance or a fluctuation in control occurs due to a fluctuation in torque of the engine, input of disturbance torque, or the like, for example. For this reason, the second target differential rotation speed as described above is set in consideration of such control disturbance or the fluctuation in control. Thus, the strut can be operated in a state that the differential rotation speed is reliably negative. In other words, the strut can be operated in a state that the load is never applied to the strut. Thus, the strut can easily be operated and reliably be engaged at the specified position. In addition, in the case where the differential rotation speed is maintained at the second target differential rotation speed as described above, timing for starting the actuator operation or for increasing the differential rotation speed to the positive side so as to engage the selectable one-way clutch and thus to transmit the torque is set in consideration of the time at which the operation of the actuation or the strut is completed. Therefore, the selectable one-way clutch in the disengaged state can appropriately and reliably be switched to the engaged state.

In the above aspect, a second differential rotation speed may be set as a threshold on a positive side for maintaining the differential rotation speed to be positive in the lock rotation control. The electronic control unit may be configured to execute the unlock rotation control in which the differential rotation speed is once maintained to be negative and then execute the lock rotation control again, in the case where the differential rotation speed becomes equal to or higher than the second differential rotation speed during execution of the lock rotation control.

According to the above aspect, in the case where the differential rotation speed that exceeds the second differential rotation speed is generated due to an influence of the fluctuation in torque of the engine, disturbance, or the like, for example, when the differential rotation speed of the selectable one-way clutch is maintained to be positive as described above, the differential rotation speed is once reduced. Then, the differential rotation speed is increased such that the differential rotation speed is maintained to be positive again. Next, the control for engaging the part of the strut with the part of the second clutch member is executed in the state that the differential rotation speed is maintained at the positive value again. Accordingly, a situation where the part of the strut is engaged with the part of the second clutch member in a state that inertia torque or an impact force is increased due to the high differential rotation speed can be avoided. As a result, the selectable one-way clutch can appropriately be brought into the engaged state. In addition, when the differential rotation speed is once reduced, the differential rotation speed is not reduced to the negative side. Thus, time required for the control can be shortened.

In the above aspect, a second differential rotation speed may be set as a threshold on a positive side for maintaining the differential rotation speed to be positive in the lock rotation control. The electronic control unit may be configured to reduce the differential rotation speed once and execute the lock rotation control again, in the case where the differential rotation speed becomes equal to or higher than the second differential rotation speed during the execution of the lock rotation control.

According to the above aspect, in the case where the differential rotation speed that exceeds the second differential rotation speed is produced due to the influence of the fluctuation in torque of the engine, disturbance, or the like, for example, when the differential rotation speed of the selectable one-way clutch is maintained to be positive as described above, the differential rotation speed is once reduced to the second target differential rotation speed on the negative side and maintained at the second target differential rotation speed. In other words, the unlock rotation control is executed. Then, the differential rotation speed is increased such that the differential rotation speed is maintained to be positive again. Then, the control for engaging the part of the strut with the part of the second clutch member in the state that the differential rotation speed is maintained to be positive is executed again. Accordingly, a situation where the part of the strut is engaged with the part of the second clutch member in a state that inertia torque or an impact force is increased due to the high differential rotation speed can be avoided. As a result, the selectable one-way clutch can appropriately be brought into the engaged state. In addition, the unlock rotation control as described above is executed when the lock rotation control is executed again. Thus, the selectable one-way clutch can reliably be brought into the engaged state.

In the above aspect, the first differential rotation speed may have a specified differential rotation speed range between an upper limit of the first differential rotation speed and a lower limit of the first differential rotation speed. The ratchet mechanism may be configured that the part of the strut is not engaged with the part of the second clutch member when the differential rotation speed is equal to or higher than the upper limit of the first differential rotation speed and that the part of the strut is engaged with the part of the second clutch member when the differential rotation speed is lower than the lower limit of the first differential rotation speed. The second differential rotation speed may be set as a value that is higher than the lower limit of the first differential rotation speed and is equal to or lower than the upper limit of the first differential rotation speed.

According to the above aspect, the upper limit of the first differential rotation speed and the lower limit of the first differential rotation speed are set for the first differential rotation speed of the ratchet mechanism. In the ratchet mechanism, due to an unavoidable fluctuation in the operation, the part of the strut is possibly engaged or not engaged with the part of the second clutch member in a state that the differential rotation speed of the selectable one-way clutch is in the vicinity of the first differential rotation speed. For this reason, the upper limit of the first differential rotation speed and the lower limit of the first differential rotation speed as described above are set. Accordingly, it is possible to distinguish a state of the differential rotation in which the part of the strut and the part of the second clutch member are reliably engaged from a state of the differential rotation in which the part of the strut and the part of the second clutch member are never engaged due to the operation of the ratchet mechanism. Furthermore, in the above aspect, the above-described second differential rotation speed is set as a value between the upper limit of the first differential rotation speed and the lower limit of the first differential rotation speed. Thus, even when the operation of the ratchet mechanism fluctuates due to the influence of the disturbance, for example, the selectable one-way clutch can reliably be brought into the engaged state.

In the above aspect, a third differential rotation speed may be set as an upper limit on a positive side that is used when the differential rotation speed is maintained to be positive in the lock rotation control. The electronic control unit may be configured to stop the lock rotation control, in the case where the differential rotation speed becomes equal to or higher than the third differential rotation speed during execution of the lock rotation control.

In the above aspect, the third differential rotation speed may be set as a value that is higher than the upper limit of the first differential rotation speed.

According to the above aspect, in the case where the differential rotation speed of the selectable one-way clutch that is high enough to exceed the third differential rotation speed is produced due to the influence of the unexpected significant disturbance or the like, for example, the lock rotation control is immediately stopped. Accordingly, a situation where the selectable one-way clutch is engaged in a state that the differential rotation speed is abnormally high can be avoided.

In the above aspect, the electronic control unit may be configured to determine that switching of the selectable one-way clutch to the engaged state is completed in the case where the differential rotation speed is reduced to be equal to or lower than a specified value during execution of the lock rotation control.

According to the above aspect, the differential rotation speed of the selectable one-way clutch is detected and evaluated. Thus, the engagement determination on the selectable one-way clutch can be made. In other words, the engagement determination on the selectable one-way clutch can easily be made without specially providing a sensor, a switch, or the like.

In the above aspect, the vehicle may have an internal combustion engine and the power transmission mechanism. The power transmission mechanism may have a fixed section and a first differential mechanism. Either the first clutch member or the second clutch member may be coupled to the fixed section. The fixed section may be configured not to rotate or move. The first differential mechanism may have a first rotary element, a second rotary element, and a third rotary element. The first rotary element, the second rotary element, and the third rotary element may be configured to perform a differential action with respect to each other. The internal combustion engine may be coupled to the first rotary element. The motor and the other one of the first clutch member and the second clutch member may be coupled to the second rotary element. The third rotary element may be configured to output torque.

In the above aspect, the vehicle may have an internal combustion engine and the power transmission mechanism. The power transmission mechanism may have the fixed section, the first differential mechanism, and a second differential mechanism. Either the first clutch member or the second clutch member may be coupled to the fixed section. The fixed section may be configured not to rotate or move. The first differential mechanism may have the first rotary element, the second rotary element, and the third rotary element. The first rotary element, the second rotary element, and the third rotary element may be configured to perform the differential action with respect to each other. The internal combustion engine may be coupled to the first rotary element. The motor may be coupled to the second rotary element. The third rotary element may be configured to output torque. The second differential mechanism may have a fourth rotary element, a fifth rotary element, and a sixth rotary element. The fourth rotary element, the fifth rotary element, and the sixth rotary element may be configured to perform the differential action with respect to each other. The first rotary element may be coupled to the fourth rotary element. The second rotary element may be coupled to the fifth rotary element. The other one of the first clutch member and the second clutch member may be coupled to the sixth rotary element. The fifth rotary element may be configured to rotate in an opposite direction from the fourth rotary element by stopping a rotation of the sixth rotary element.

The above aspect can be applied to the control device for the power transmission mechanism in which a speed of the internal combustion engine can be controlled by the motor via the differential mechanism. In this case, the selectable one-way clutch can selectively restrict rotation of any of the rotary elements of the differential mechanism in a specified direction. Then, the selectable one-way clutch can reliably and appropriately be switched from the disengaged state to the engaged state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a flowchart for illustrating an example of control that is executed by a control device of the invention;

DETAILED DESCRIPTION OF EMBODIMENTS

Figure 1:
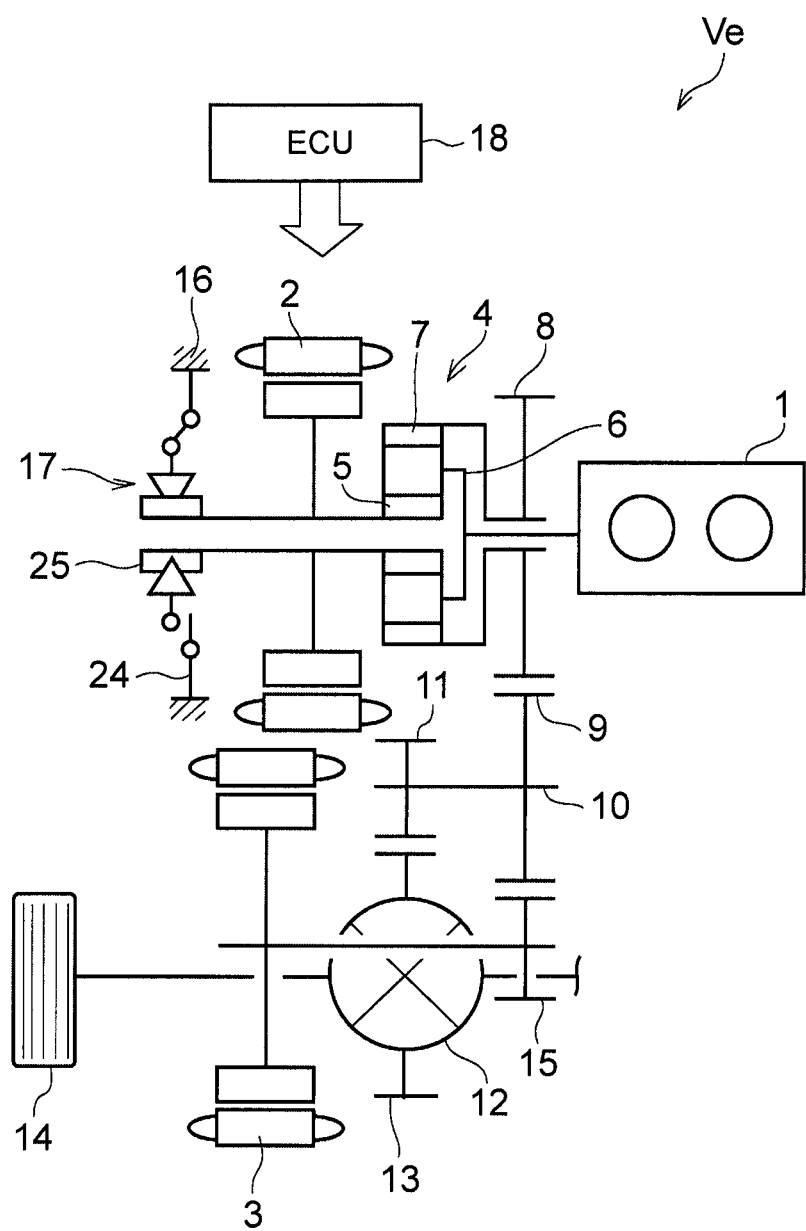
FIG. 1 is a view of an example of a configuration of a power transmission mechanism in a hybrid vehicle to which the invention is applied.

Next, a specific description will be made on the invention with reference to the drawings. The invention can be applied to a control system of which a power transmission mechanism in a hybrid vehicle is a subject. First, an example of a configuration of the power transmission mechanism will be described. FIG. 1 schematically shows the power transmission mechanism in a hybrid vehicle Ve of double-spindle two-motor type. The hybrid vehicle Ve includes: an engine (Eng) 1 as an example of an internal combustion engine of the invention; a first motor (MG1) 2 an example of a motor of the invention; and a second motor (MG2) 3 as drive power sources.

The first motor 2 is configured to mainly execute control of a speed of the engine 1 and cranking of the engine 1. This first motor 2 is also configured to function as one of the drive power sources in a two-motor travel mode (a two-motor EV mode) in which a vehicle travels by the two motors. Together with the engine 1, the first motor 2 is coupled to a power split mechanism 4 that is an example of the first differential mechanism of the invention.

In this example shown in FIG. 1, the power split mechanism 4 is constructed of a planetary gear mechanism of single pinion type that includes a sun gear 5, a carrier 6, and a ring gear 7 as rotary elements. A rotor of the first motor 2 is coupled to the sun gear 5 that is an example of a second rotary element of the invention among the rotary elements. In addition, an output shaft (a crankshaft) of the engine 1 is coupled to the carrier 6 that is an example of a first rotary element of the invention. The ring gear 7 that is an example of a third rotary element of the invention is an output element. An output gear 8 as an output member is attached to the ring gear 7. The output gear 8 meshes with a counter driven gear 9. The counter driven gear 9 is attached to a counter shaft 10. A counter drive gear 11 that has a smaller diameter than the counter driven gear 9 is attached to the counter shaft 10. The counter drive gear 11 meshes with a ring gear 13 in a differential gear 12. Then, the differential gear 12 outputs drive torque to right and left drive wheels 14.

The second motor 3 is configured to mainly function as a drive power source for a travel. A drive gear 15 is attached to a rotor shaft of the second motor 3. The drive gear 15 meshes with the counter driven gear 9. This drive gear 15 has a smaller diameter than the counter driven gear 9. In this manner, the drive gear 15 and the counter driven gear 9 constitute a speed reduction mechanism.

A selectable one-way clutch (hereinafter described as an SOWC) 17 is provided between the sun gear 5, to which the first motor 2 is coupled, and a casing 16 that is an example of a fixed section of the invention. This SOWC 17 is a clutch that is configured to enable relative rotation in both directions of positive rotation and reverse rotation so as to prevent torque transmission in a disengaged state. This SOWC 17 is also a clutch that is configured to restrict the relative rotation in only one direction of the positive rotation and the reverse rotation so as to transmit the torque in the direction of the relative rotation and to enable the relative rotation in an opposite direction therefrom, so as to prevent the torque transmission in an engaged state. Here, the positive rotation refers to rotation in the same direction as a rotational direction of the engine 1. This rotational direction refers to a positive rotational direction. The reverse rotation (or negative rotation) refers to rotation in an opposite direction from the rotational direction of the engine 1. This rotational direction refers to a reverse rotational direction. In addition, similar to the SOWC described in above-described US 2009/0084653 A, this SOWC 17 is configured to be able to transmit the torque when a difference in the rotational speed (differential rotation) between the two rotary members that are involved in torque transmission, that is, between a first clutch plate 24 and a second clutch plate 25, which will be described below, is positive. This SOWC 17 is configured not to transmit the torque when the differential rotation speed is negative. Noted that the specific configuration of this SOWC 17 will be described below.

The first motor 2 and the second motor 3 are connected to an electrical storage device and a controller unit such as an inverter, which are not shown. In addition, the motors 2, 3 are electrically connected to each other to enable electrical power transfer therebetween. Furthermore, an electronic control unit (ECU) 18 is provided to control these electrical storage device and controller unit, the SOWC 17, or the like. This electronic control unit 18 is constructed of a microcomputer as a main body. This electronic control unit 18 is configured to receive detection signals indicative of a vehicle speed, an accelerator operation amount, an engine speed, estimated output torque, a rotational speed and torque of each of the motors 2, 3, an operating state of the SOWC 17, and the like as data. In addition, this electronic control unit 18 is configured to output command signals for controlling each of the motors 2, 3 and the SOWC 17, the command signals being obtained by performing computation based on the input data.

Figure 2:
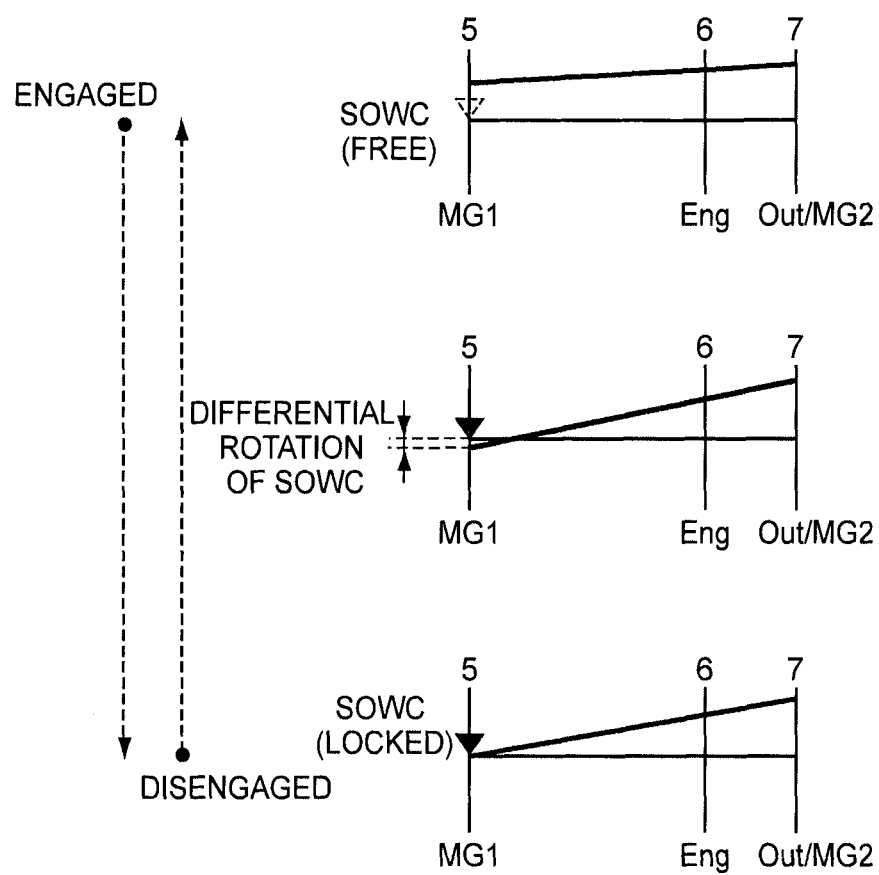
FIG. 2 includes collinear diagrams on a planetary gear mechanism that constitutes the power transmission mechanism in the hybrid vehicle shown in FIG. 1.

FIG. 2 includes collinear diagrams on the planetary gear mechanism that constitutes the above power split mechanism 4. A top diagram in FIG. 2 indicates a forward traveling state in a hybrid mode (an HV mode or a power split mode). In this state shown in the top diagram in FIG. 2, the engine 1 is driven, and thus the carrier 6 rotates in the positive rotational direction. In addition, due to the forward travel of the vehicle Ve, the ring gear 7 rotates in the positive rotational direction. At this time, the SOWC 17 is disengaged, and thus the sun gear 5 and the first motor 2, which is coupled to the sun gear 5, can rotate in either the positive rotation or the reverse rotation. In this state shown in the top diagram in FIG. 2, the first motor 2 functions as an electrical power generator while making the positive rotation. In other words, the first motor 2 outputs torque in a negative direction (a downward direction in the top diagram in FIG. 2) and thereby controls the speed of the engine 1 to a speed at which excellent fuel efficiency can be realized. In this case, the electrical power generated in the first motor 2 is supplied to the second motor 3. Then, the second motor 3 functions as the motor and outputs drive power for the travel.

A second diagram from the top in FIG. 2 indicates a transient state (a transition state) in which the SOWC 17 is switched between the state shown in the top diagram in FIG. 2 and a state shown in the third diagram from the top in FIG. 2, which will be described below. In other words, the second diagram from the top in FIG. 2 indicates a transient state when the SOWC 17 is switched from the disengaged state (free) to the engaged state (locked) in which the positive rotation of the sun gear 5 is stopped. In this state shown in the second diagram from the top in FIG. 2, the first motor 2 functions as the motor and rotates the sun gear 5 in a reverse rotational direction. As a result, the negative differential rotation is produced in the SOWC 17. In other words, the SOWC 17 does not transmit the torque. Thus, when the engagement control of the SOWC 17 is executed in this state, the torque is not applied to the strut of the SOWC 17, which will be described below.

A third diagram from the top in FIG. 2 indicates a state in which the positive rotation of the sun gear 5 is stopped by the SOWC 17 and in which the vehicle travels forward by the drive power of the engine 1 or by the drive power of the engine 1 and the drive power of the second motor 3 (in a so-called parallel mode). In this state shown in the third diagram from the top in FIG. 2, a rotational speed of the ring gear 7 is higher than the engine speed (a rotational speed of the carrier 6), and thus the torque is output from the ring gear 7. When the second motor 3 is operated as the motor in this state, the drive power thereof is added to the drive power that is output from the ring gear 7 and is transmitted to the drive wheels 14 via the differential gear 12. Also in this case, the first motor 2 and the sun gear 5 are fixed, and energization thereof is stopped (in an OFF state). Thus, the excellent fuel efficiency can be realized when the vehicle travels at a high speed.

Figure 3:
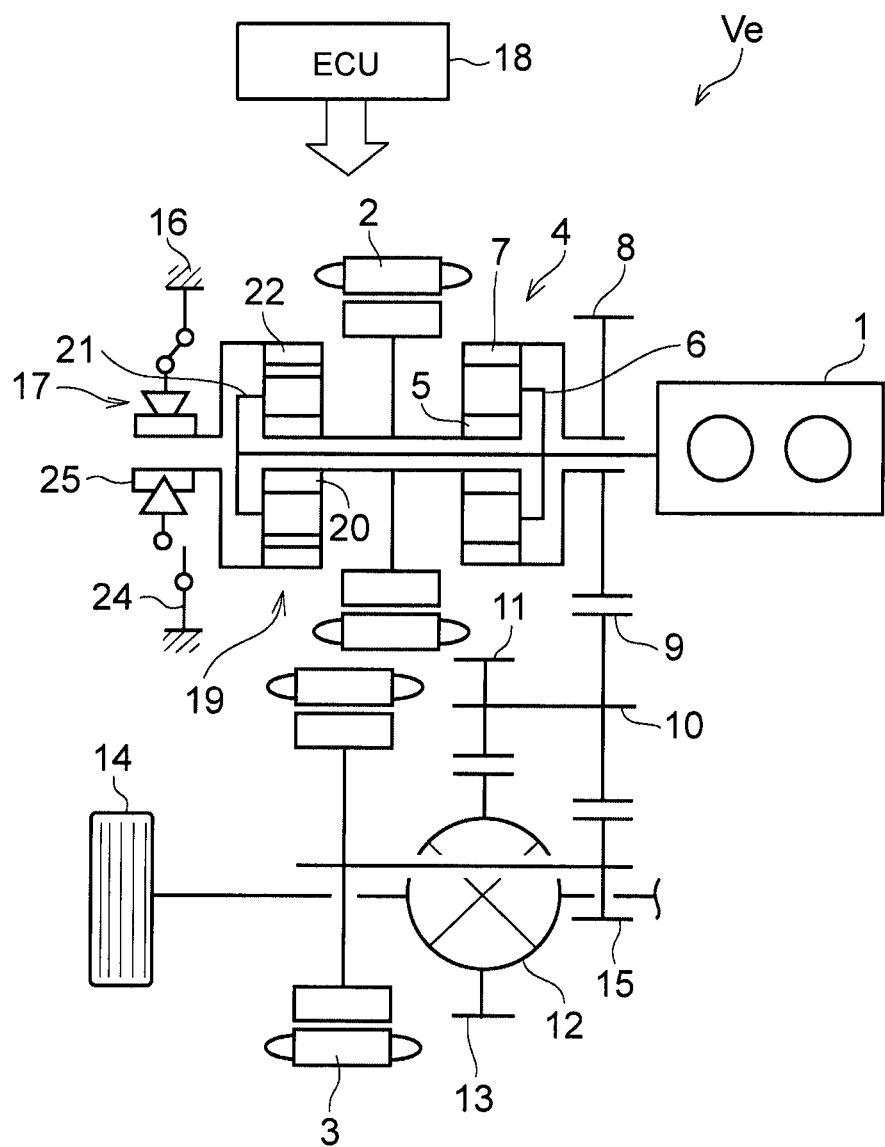
FIG. 3 is a view of another example of the configuration of the power transmission mechanism in the hybrid vehicle to which the invention is applied.

FIG. 3 shows another example of the configuration of the power transmission mechanism that can be the subject of the invention. In this configuration shown in FIG. 3, an overdrive (O/D) mechanism 19 is added to the above-described configuration shown in FIG. 1. This configuration shown in FIG. 3 is also an example in which the overdrive mechanism 19 is selectively locked by the SOWC 17. The overdrive mechanism 19 is an example of a second differential mechanism of the invention. In this example shown in FIG. 3, the overdrive mechanism 19 is constructed of a planetary gear mechanism of double pinion type that includes a sun gear 20, a carrier 21, and a ring gear 22 as rotary elements. The carrier 6 in the above-described power split mechanism 4 is coupled to the carrier 21 that is an example of a fourth rotary element of the invention. Accordingly, it is configured that the output torque of the engine 1 is transmitted to these carrier 6 and carrier 21. In addition, the sun gear 5 in the power split mechanism 4 is coupled to the sun gear 20 that is an example of a fifth rotary element of the invention. Accordingly, it is configured that the torque of the first motor 2 is transmitted to these sun gear 5 and sun gear 20. Furthermore, the above-described SOWC 17 is arranged between the casing 16 and the ring gear 22 that is an example of a sixth rotary element of the invention. It is configured that the SOWC 17 restricts (inhibits) rotation of the ring gear 22 in a specified direction, so as to set an overdrive state. The rotary elements of the planetary gear mechanism of the single pinion type that constitutes the power split mechanism 4 and the rotary elements of the planetary gear mechanism of the double pinion type that constitutes the overdrive mechanism 19 are coupled as described above. In this way, a so-called compound planetary gear mechanism having the four elements is constructed. Since the rest of the configuration of the power transmission mechanism is the same as the configuration shown in FIG. 1, components shown in this FIG. 3 are denoted by the same reference numerals as those used in FIG. 1, and the description thereof will not be made.

Figure 4:
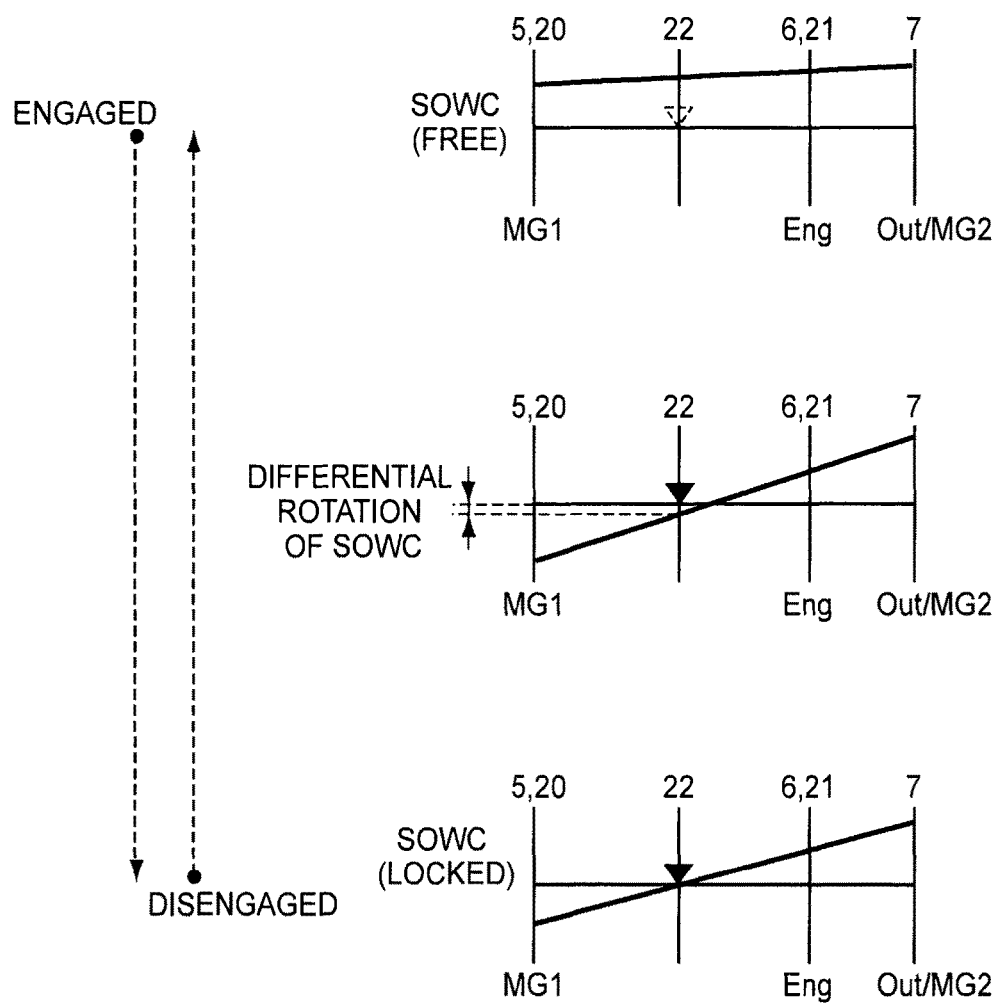
FIG. 4 includes collinear diagrams on a compound planetary gear mechanism that constitutes a power split mechanism and an overdrive mechanism in the hybrid vehicle shown in FIG. 3.

FIG. 4 includes collinear diagrams on the above compound planetary gear mechanism. A top diagram in FIG. 4 indicates the forward traveling state in the hybrid mode (the HV mode or the power split mode). In this state shown in the top diagram in FIG. 4, the engine 1 is driven, and thus the carrier 6 rotates in the positive rotational direction. In addition, due to the forward travel of the vehicle Ve, the ring gear 7 rotates in the positive rotational direction. At this time, the SOWC 17 is disengaged, and thus the sun gear 5 or the ring gear 22, and the first motor 2, which can rotate the sun gear 5 and the ring gear 22, can rotate in either the positive rotation or the reverse rotation. In this state shown in the top diagram in FIG. 4, the first motor 2 functions as the electrical power generator while making the positive rotation. In other words, the first motor 2 outputs the torque in a negative direction (a downward direction in the top diagram in FIG. 4) and thereby controls the speed of the engine 1 to the speed at which the excellent fuel efficiency can be realized. In this case, the electrical power generated in the first motor 2 is supplied to the second motor 3. Then, the second motor 3 functions as the motor and outputs the drive power for the travel.

A second diagram from the top in FIG. 4 indicates a transient state (a transition state) in which the SOWC 17 is switched between the state shown in the top diagram in FIG. 4 and a state shown in the third diagram from the top in FIG. 4, which will be described below. In other words, the second diagram from the top in FIG. 4 indicates a transient state when the SOWC 17 is switched from the disengaged state (free) to the engaged state (locked) in which the SOWC 17 stops the positive rotation of the ring gear 22. In this state shown in the second diagram from the top in FIG. 4, the first motor 2 functions as the motor and rotates the sun gear 5 or the ring gear 22 in the reverse rotational direction. The rotational speed at this time is the rotational speed at which the ring gear 22 rotates in the reverse rotational direction, and the negative differential rotation is produced in the SOWC 17. In other words, the SOWC 17 does not transmit the torque. Thus, when the engagement control of the SOWC 17 is executed in this state, the torque is not applied to the strut of the SOWC 17, which will be described below.

A third diagram from the top in FIG. 4 indicates a state in which the positive rotation of the ring gear 22 is stopped by the SOWC 17 and in which the vehicle travels forward by the drive power of the engine 1 or by the drive power of the engine 1 and the drive power of the second motor 3. In this state shown in the third diagram from the top in this FIG. 4, the ring gear 22 in the overdrive mechanism 19 is fixed so as not to rotate in the positive rotational direction. Then, torque in the positive rotational direction is applied to the carrier 21. Accordingly, the sun gear 20 rotates in the reverse rotational direction. In the power split mechanism 4, the sun gear 5 is integrated with the sun gear 20 in the overdrive mechanism 19 and rotates in the reverse rotational direction. Accordingly, in the power split mechanism 4, since the torque of the engine 1 is applied to the carrier 6 in the state that the sun gear 5 rotates in the reverse rotational direction, the ring gear 7 as the output element rotates at the higher rotational speed than the carrier 6 (that is, the engine 1). In other words, the overdrive state is generated. When the second motor 3 is operated as the motor in this state, the drive power thereof is added to the drive power that is output from the ring gear 7 and is transmitted to the drive wheels 14 via the differential gear 12. Noted that, in this overdrive state, the first motor 2 is fixed with the ring gear 22 and controlled to be in the OFF state. Thus, the excellent fuel efficiency can be realized when the vehicle travels at a high speed.

Figure 5:
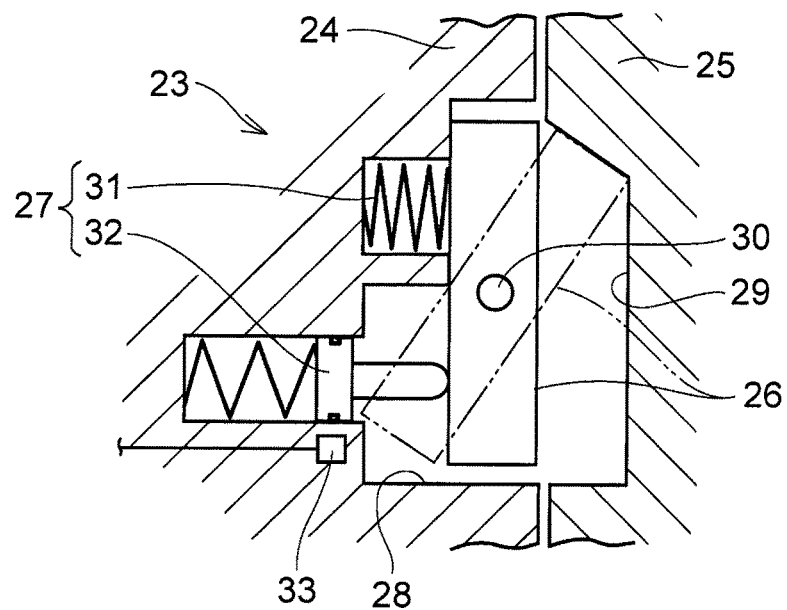
FIG. 5 is a cross-sectional view of a configuration of a selectable one-way clutch that can be a subject of the invention.
Figure 6:
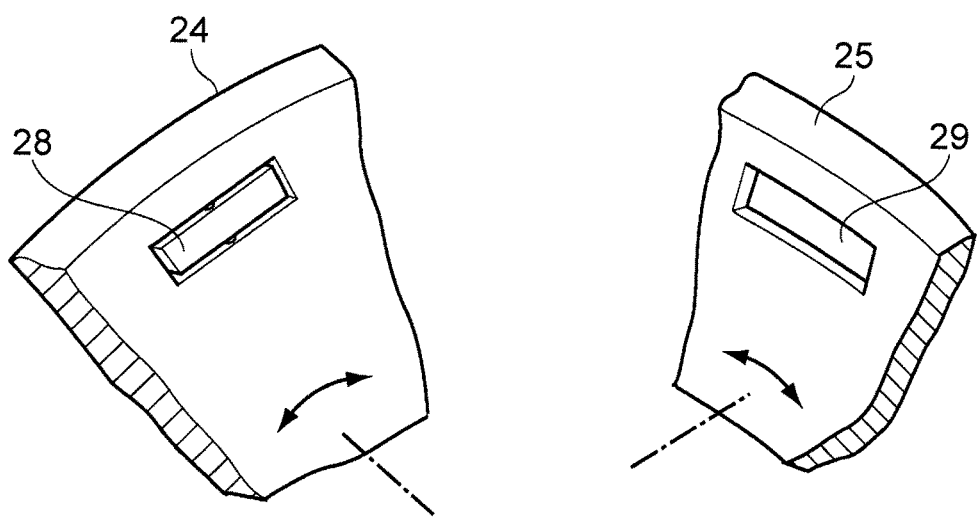
FIG. 6 is a view of a housing section and a pocket, the housing section being formed in a first clutch plate and the pocket being formed in a second clutch plate of the selectable one-way clutch shown in FIG. 5.

Here, the configuration of the SOWC 17 will be described. In the power transmission mechanism that is the subject of the invention, for example, the SOWC that is described in above-described US 2009/0084653 A, the SOWC that is described in above-described US 2013/0062151 A, an SOWC that is described in US 2010/0252384 A, or the like can be adopted. Furthermore, the SOWC 17 that is configured as shown in FIG. 5 and FIG. 6 can be adopted. These FIG. 5 and FIG. 6 show an engagement mechanism 23 in the SOWC 17. This engagement mechanism 23 is mainly constructed of the first clutch plate 24, the second clutch plate 25, a strut 26, and an actuation mechanism 27.

The first clutch plate 24 is formed in a disc shape as a whole. The second clutch plate 25 that is also formed in the disc shape as the first clutch plate 24 is arranged to face this first clutch plate 24. Of these clutch plates 24, 25, the first clutch plate 24 is an example of a first clutch member of the invention. Of these clutch plates 24, 25, the second clutch plate 25 is an example of a second clutch member of the invention. These clutch plates 24, 25 are retained to enable relative rotation to each other. For example, the one clutch plate 24 (25) is attached to the above-described casing 16. The other clutch plate 25 (24) is coupled to the sun gear 5 in the example shown in FIG. 1. Alternatively, in the example shown in FIG. 3, the other clutch plate 25 (24) is coupled to the ring gear 22.

The first clutch plate 24 is provided with a recessed section that is elongated in a rotational direction at a position that is in a front surface of the first clutch plate 24 and that is shifted to a radially outer side from the center of rotation of the first clutch plate 24, that is, at a specified position on an outer peripheral side. This recessed section is a housing section 28 for housing the strut 26. The second clutch plate 25 is provided with a pocket 29 that is a recessed section in the substantially same shape as the housing section 28 at a radial position that is in a surface of the second clutch plate 25 facing the first clutch plate 24 and that corresponds to the housing section 28. A plate-shaped engagement piece whose cross section is substantially the same as that of the housing section 28, that is, the strut 26 is housed in the housing section 28. The strut 26 is arranged in the housing section 28 in a manner to swing with a support pin 30 being the center, the support pin 30 being provided at the center in a longitudinal direction of the strut 26 and facing the radial direction of the first clutch plate 24. A depth of the recessed section of the housing section 28 is changed at the support pin 30. More specifically, an upper half of the housing section 28 in FIG. 5 has a thickness that is substantially equal to a thickness of the strut 26 or that is slightly larger than the thickness of the strut 26. Then, a lower half of the housing section 28 in FIG. 5 has a thickness that is larger than the thickness of the strut 26. In this way, the strut 26 is configured to be able to swing with the support pin 30 being the center.

A spring 31 that causes an elastic force to act in a direction to push out one end side of the strut 26 from the housing section 28 is arranged in a shallow portion of the housing section 28. In addition, an actuator 32 that presses another end side of the strut 26 in the direction to push out from the housing section 28 is arranged in a deep portion of the housing section 28. This actuator 32 only needs to be able to apply a pressing force to the other end side of the strut 26. For example, a hydraulic actuator such as a hydraulic piston or an electromagnetic actuator such as a solenoid that generates thrust by using an electromagnetic force can be adopted. Accordingly, in a state that the actuator 32 does not press the other end of the strut 26, it is configured that the one end of the strut 26 is pressed by the spring 31 and is projected from the housing section 28 toward the pocket 29 on the second clutch plate 25 side. In addition, in a state that the actuator 32 presses the other end of the strut 26, it is configured that the strut 26 rotates about the support pin 30 in a direction to compress the spring 31 and that the entire strut 26 is housed in the housing section 28. In other words, it is configured to inhibit the strut 26 from being projected to the second clutch plate 25 side.

As described above, the spring 31 and the actuator 32 constitute the actuation mechanism 27 for operating the strut 26. Then, as described above, a state that the actuator 32 does not press the other end of the strut 26 and that the one end of the strut 26 is pressed by the spring 31 and projected from the housing section 28 toward the pocket 29 on the second clutch plate 25 side corresponds to a state that the projection of the strut 26 to the second clutch plate 25 is permitted. That is, such a state is an example of the first state of the invention. In addition, a state that the actuator 32 presses the other end of the strut 26, that the strut 26 rotates about the support pin 30 in a direction to compress the spring 31, and that the entire strut 26 is housed in the housing section 28 corresponds to a state that the projection of the strut 26 to the second clutch plate 25 side is inhibited. That is, such a state is an example of the second state of the invention. Accordingly, the actuation mechanism 27 for operating the strut 26 by the above spring 31 and actuator 32 is an example of a switching mechanism of the invention.

Noted that, in the above engagement mechanism 23, an appropriate elastic member such as a spring may be interposed between the actuator 32 and the other end of the strut 26 in order to relax the pressing force generated by the actuator 32 or to permit swinging of the strut 26 in the state that the actuator 32 presses the other end of the strut 26. In addition, the following description will be made on an example in which it is configured that, when the actuator 32 is controlled to be OFF, the actuator 32 presses the other end of the strut 26 so as to bring the engagement mechanism 23 into the disengaged state. The following description will further be made on an example in which it is also configured that, when the actuator 32 is controlled to be ON, the actuator 32 cancels pressing of the other end of the strut 26 so as to bring the engagement mechanism 23 into an engaged state.

As described above, the pocket 29 that is provided in the second clutch plate 25 is a portion which the one end of the strut 26 projected from the housing section 28 enters and is engaged with. Accordingly, in the engagement mechanism 23, in a state that the one end of the strut 26 is projected to the second clutch plate 25 side, in the case where torque in the positive rotational direction acts on either one of the clutch plates 24, 25, the strut 26 is meshed between the housing section 28 and the pocket 29. That torque in the positive rotational direction acts on either one of the clutch plates 24, 25 means that torque in an upward direction of FIG. 5 acts on the first clutch plate 24 or that torque in a downward direction of FIG. 5 acts on the second clutch plate 25. As a result, the clutch plates 24, 25 are integrally coupled in the rotational direction. That is, the relative rotation of the first clutch plate 24 in the upward direction of FIG. 5 to the second clutch plate 25 is restricted. In other words, the relative rotation of the second clutch plate 25 in the downward direction of FIG. 5 to the first clutch plate 24 is restricted. The restricted rotational direction in this case is the positive rotational direction in each of the power transmission mechanisms shown in above-described FIG. 1 and FIG. 3. A state that the positive rotation of the above-described sun gear 5 or ring gear 22 is restricted (or inhibited), just as described, is the engaged state of the engagement mechanism 23 or the SOWC 17.

In the engaged state of the SOWC 17 as described above, in the case where the torque in the reverse rotational direction (the negative rotational direction) acts on either one of the clutch plates 24, 25, the surface of the strut 26 is pressed by an edge portion of an opening end of the pocket 29 in the second clutch plate 25. That the torque in the reverse rotational direction (the negative rotational direction) acts on either one of the clutch plates 24, 25 means that the torque in the downward direction of FIG. 5 acts on the first clutch plate 24 or that the torque in the upward direction of FIG. 5 acts on the second clutch plate 25. As a result, the strut 26 acts against the elastic force of the spring 31 and is pushed in the housing section 28. In other words, the engagement by the strut 26 is canceled, and the clutch plates 24, 25 can rotate relatively. Then, when the actuator 32 presses the other end of the strut 26, the strut 26 rotates in such a direction that the one end thereof enters the housing section 28 while compressing the spring 31. As a result, the strut 26 is housed in the housing section 28. Accordingly, the member that connects the clutch plates 24, 25 no longer exist, and thus the clutch plates 24, 25 can rotate relatively in either direction of the positive rotation and the reverse rotation. This state is the disengaged state of the engagement mechanism 23, that is, the SOWC 17.

As described above, the engaged state and the disengaged state of the SOWC 17 are switched by the operation of the actuator 32. Accordingly, it is possible by detecting the operating state or an operation amount of the actuator 32 to determine whether the SOWC 17 is in the engaged state or the disengaged state on the basis of the detection result. For this reason, the engagement mechanism 23 is provided with a stroke sensor 33 for performing the detection as described above. An appropriate sensor that has conventionally been known can be adopted for this stroke sensor 33. For example, the stroke sensor 33 may be a type of sensor that detects a stroke of the actuator 32 by capacitance or electrical resistance that varies by the operation amount of the actuator 32, a type of sensor that detects the stroke of the actuator 32 optically, or the like. In addition, instead of detecting the stroke of the actuator 32, a so-called ON/OFF sensor may output a signal at an advanced end and a retracted end of the actuator 32.

As described above, the SOWC 17 can be engaged when the differential rotation speed between the first clutch plate 24 and the second clutch plate 25 is positive. In other words, in the state of the positive differential rotation of the SOWC 17, the strut 26 is fitted to and engaged with the pocket 29 at the position between the first clutch plate 24 and the second clutch plate 25. Accordingly, the torque can be transmitted between the first clutch plate 24 and the second clutch plate 25 via the strut 26. In the case where the strut 26 and the pocket 29 are engaged in the state of the positive differential rotation of the SOWC 17, just as described, and where the differential rotation speed is excessively high, inertia torque from any of the other rotary members is possibly applied to the strut 26 during the engagement thereof, and thus the shock or impact force is possibly generated.

In view of this, the control device according to the invention that has the above power transmission mechanism as the subject thereof is configured to execute control, which will be described below, such that the SOWC 17 can be brought into the engaged state in an appropriate state. FIG. 7 is a flowchart for illustrating an example of such control. A routine shown in this flowchart of FIG. 7 is repeatedly executed at specified short time intervals. In addition, in the routine shown in this flowchart of FIG. 7, the control is executed with an assumption that the vehicle Ve travels in the disengaged state of the SOWC 17 and that the differential rotation speed of the SOWC 17 is positive.

In the flowchart of FIG. 7, it is first determined whether the SOWC 17 will be engaged (step S1). If a negative determination is made in this step S1 due to the lack of a request for engaging the SOWC 17, this routine is once terminated without executing control in the following steps.

On the contrary, if a positive determination is made in step S1 due to the presence of the request for engaging the SOWC 17, a process proceeds to step S2. For example, in the example of the configuration shown in FIG. 1, when the vehicle Ve travels forward by the output of the engine 1 and the output of the second motor 3, the rotation of the first motor 2 and the rotation of the sun gear 5 are locked. In such a case, the SOWC 17 is engaged. Alternatively, in the example of the configuration shown in FIG. 3, when the overdrive state is set, the rotation of the ring gear 22 in the overdrive mechanism 19 is locked. In such a case, the SOWC 17 is engaged.

In step S2, synchronous control is initiated. Here, the synchronous control refers to a series of control of the rotation speed that is executed for the engagement of the SOWC 17, and also refers to control in which the negative differential rotation speed of the SOWC 17 is once maintained to be negative for the engagement of the SOWC 17 and then is gradually increased to the positive side, so as to bring the SOWC 17 into an engageable state. More specifically, the differential rotation speed of the SOWC 17 is synchronized with unlock-side target differential rotation speed, and the rotation of the first motor 2 is controlled such that the differential rotation speed of the SOWC 17 is maintained at the unlock-side target differential rotation speed for a specified time period. That is, this control is unlock-side rotation control.

In addition, the above unlock-side target differential rotation speed (the second target differential rotation speed) corresponds to a target value that is used when the differential rotation speed of the SOWC 17 becomes negative (that is, on the unlock side). This unlock-side target differential rotation speed is set in advance on the basis of a result of an experiment, a simulation, or the like in consideration of a fluctuation in the rotational speed that is caused by control disturbance, such as a fluctuation in torque of the engine 1 or input of disturbance torque, such that the differential rotation speed of the SOWC 17 becomes negative even with occurrence of such a fluctuation.

Figure 8A:
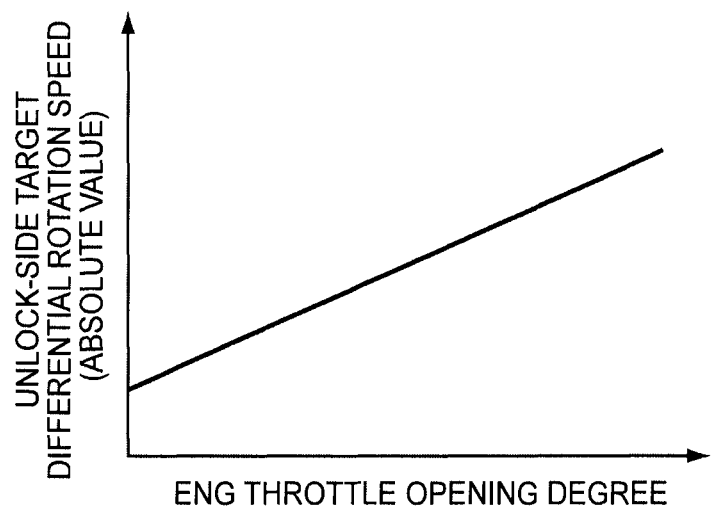
FIG. 8A is a diagram for illustrating an example of a map that is applied when the control shown in the flowchart in FIG. 7 is executed.

Furthermore, the above unlock-side target differential rotation speed can be set by changing the value in accordance with a magnitude of the predicted control disturbance. More specifically, the unlock-side target differential rotation speed can be set such that the value thereof is changed to be increased as the magnitude of the predicted control disturbance is increased. For example, a map shown in FIG. 8A or FIG. 8B can be used to set the unlock-side target differential rotation speed. In an example shown in FIG. 8A, the unlock-side target differential rotation speed is set such that an absolute value of the unlock-side target differential rotation speed is increased as a throttle opening degree of the engine 1 is increased. In the engine 1, the engine torque is increased as the throttle opening degree is increased. Then, when the engine torque is increased, the fluctuation in torque is also increased. Accordingly, the fluctuation in the differential rotation speed of the SOWC 17 is also increased by the occurrence of the significant fluctuation in torque, just as described. In such a case, the absolute value of the unlock-side target differential rotation speed is increased (that is, the value of the unlock-side target differential rotation speed is reduced on the negative side), and then the unlock rotation control is executed. Thus, even with the occurrence of the fluctuation, the differential rotation speed of the SOWC 17 can be maintained to be negative.

Figure 8B:
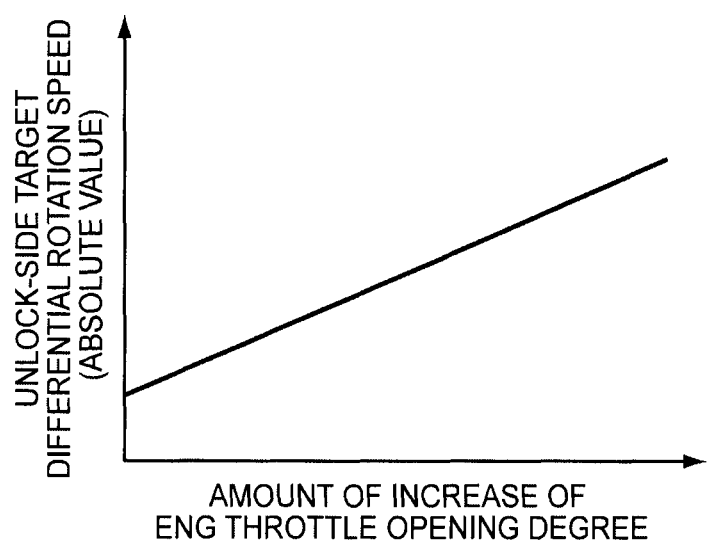
FIG. 8B is a diagram for illustrating an example of the map that is applied when the control shown in the flowchart in FIG. 7 is executed.

In addition, in an example shown in FIG. 8B, the unlock-side target differential rotation speed is set such that the absolute value of the unlock-side target differential rotation speed is increased as an amount of increase in the throttle opening degree of the engine 1, that is, an amount of change of the throttle opening degree in a direction that a throttle opens wider is increased. It is difficult to estimate the engine torque when the engine 1 is in a rapid transient state that the amount of increase in the throttle opening degree is large. Accordingly, a discrepancy between the estimated engine torque and the actual engine torque is possibly increased as the amount of increase in the throttle opening degree is increased. When such a discrepancy is increased, the fluctuation in the differential rotation speed of the SOWC 17 is possibly increased. Also in such a case, the absolute value of the unlock-side target differential rotation speed is increased (that is, the value of the unlock-side target differential rotation speed is reduced on the negative side), and the unlock rotation control is executed. Thus, even with the occurrence of the fluctuation, the differential rotation speed of the SOWC 17 can be maintained to be negative.

Once the synchronous control is initiated as described above, it is determined whether the differential rotation speed of the SOWC 17 has reached actuator ON (Act. on) differential rotation speed (step S3). The actuator ON differential rotation speed is differential rotation speed at which ON control of the actuator 32 is initiated for the engagement of the SOWC 17 in the synchronous control of the SOWC 17. This actuator ON differential rotation speed is set as a value that is zero or close to zero and also set as a value that is lower than the lock-side target differential rotation speed, which will be described below. This actuator ON differential rotation speed is also set in advance on the basis of a result of an experiment, a simulation, or the like, for example, in consideration of responsiveness of the actuator 32. Noted that, in this step S3 of the control, instead of the above actuator ON differential rotation speed, it can be determined whether the differential rotation speed of the SOWC 17 has reached the unlock-side target differential rotation speed.

A negative determination is made in this step S3 if the differential rotation speed of the SOWC 17 has not reached the actuator ON differential rotation speed. In this case, the process returns to step S2, and the above synchronous control is continued. On the contrary, a positive determination is made in step S3 if the differential rotation speed of the SOWC 17 has reached the actuator ON differential rotation speed. In this case, the process proceeds to step S4. Then, the above synchronous control is continued, and the ON control of the actuator 32 is initiated.

Once the ON control of the actuator 32 is initiated, it is determined whether a stroke (an operation) of the actuator 32 is completed (step S5). Once the ON control is initiated, the actuator 32 is operated to cancel pressing of the strut 26, so as to project the strut 26 to the second clutch plate 25 side. Accordingly, in this step S5, the operating state of the actuator 32 can be determined on the basis of the detection signal of the stroke sensor 33 or the ON/OFF sensor.

A negative determination is made in this step S5 if the operation of the actuator 32 for engagement of the engagement mechanism 23 has not been completed. In this case, the process returns to step S4, and the above synchronous control and ON control of the actuator 32 are continued.

On the contrary, a positive determination is made in step S5 if the operation of the actuator 32 for the engagement of the engagement mechanism 23 has been completed. In this case, the process proceeds to step S6. Then, it is determined whether a specified time period has elapsed since the initiation of the ON control of the actuator 32. This specified time period is estimated and set in advance as time required for the strut 26 to move to a specified position for engagement by the operation of the actuator 32 in consideration of the responsiveness of the actuator 32 and the operation of the strut 26. This specified time period is also set in advance on the basis of a result of an experiment, a simulation, or the like, for example.

A negative determination is made in this step S6 if the specified time period has not elapsed. In this case, the process returns to step S4, and the above synchronous control and ON control of the actuator 32 are continued.

On the contrary, if a positive determination is made in step S6 due to a lapse of the specified time, a process proceeds to step S7. Then, lock rotation control is initiated. This lock rotation control is control in which the differential rotation speed of the SOWC 17, which is maintained at the unlock-side differential rotation speed on the negative side (that is, the unlock side), is increased to the differential rotation speed on the positive side (that is, the lock side), so as to bring the SOWC 17 into the engageable state. More specifically, the rotation of the first motor 2 is controlled such that the differential rotation speed of the SOWC 17 is a value on the positive side.

Figure 9:
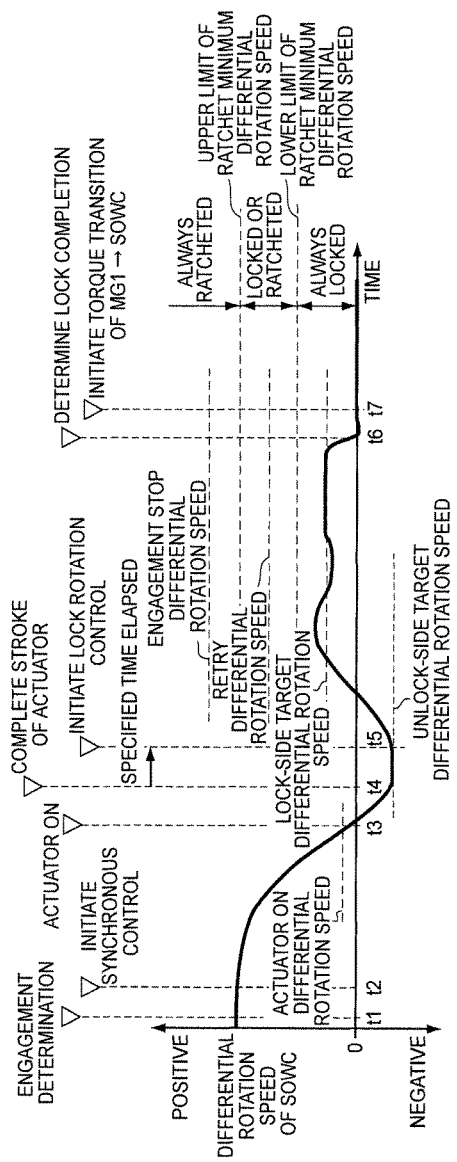
FIG. 9 is a time chart that shows an example of a change in differential rotation speed of the selectable one-way clutch when the control shown in the flowchart of FIG. 7 is executed.

Once the lock rotation control is initiated in step S7 as described above, the differential rotation speed of the SOWC 17 is then increased to the lock-side target differential rotation speed (the first target differential rotation speed) and maintained at the lock-side target differential rotation speed (step S8). The lock-side target differential rotation speed is a target value that is used when the differential rotation speed of the SOWC 17 is maintained to be positive in the lock rotation control, and is also the differential rotation speed that allows the engagement of the SOWC 17 in the state that the differential rotation speed of the SOWC 17 is positive. This lock-side target differential rotation speed is set in advance as an appropriate value for the engagement of the SOWC 17 on the basis of a result of an experiment, a simulation, or the like in consideration of the fluctuation in the rotational speed caused by the control disturbance, such as the fluctuation in the torque of the engine 1 or the input of disturbance torque, responsiveness of the control, such as a delayed time period and the overshoot, and the like, for example. In addition, as shown in FIG. 9, this lock-side target differential rotation speed is set as a value that is lower than a lower limit of ratchet minimum differential rotation speed, which will be described below.

Noted that, this flowchart in FIG. 7 illustrates the control example in which the lock rotation control is executed after the unlock rotation control is executed, as described above. In other words, this flowchart in FIG. 7 illustrates the control example in which the lock rotation control is executed after the differential rotation speed of the SOWC 17 becomes negative. On the contrary, the control device according to the invention can also be configured that the lock rotation control is executed without bringing the differential rotation of the SOWC 17 into the negative state. For example, in the above control example, instead of executing the unlock rotation control, the differential rotation speed of the SOWC 17 may be controlled to be maintained at positive differential rotation that the speed is zero or close to zero, and then the lock rotation control as described above may be executed. With such control, compared to a case where the differential rotation speed of the SOWC 17 is reduced to be negative, the time required for the control is shortened, and thus the responsiveness of the control can be improved.

As described above, the engagement mechanism 23 of this SOWC 17 can be engaged when the differential rotation speed of the SOWC 17 is positive. In addition to the above, this SOWC 17 is provided with a ratchet function that inhibits the engagement between the strut 26 and the pocket 29 when the differential rotation speed is excessively high. More specifically, this SOWC 17 is configured that the strut 26 is flicked by an opening portion of the pocket 29 and thus cannot be engaged with the pocket 29 (that is, a ratchet action is exerted) when the differential rotation speed of the SOWC 17 is higher than specified differential rotation speed. The specified differential rotation speed in this case is the ratchet minimum differential rotation speed (the first differential rotation speed). Accordingly, the SOWC 17 is configured that it can be engaged (locked) when the differential rotation speed thereof is lower than the ratchet minimum differential rotation speed and that it is ratcheted and thus cannot be engaged when the differential rotation speed thereof is higher than the ratchet minimum differential rotation speed. If the SOWC 17 is engaged at the high differential rotation speed, the impact caused by the engagement of the strut 26 and the pocket 29 becomes substantial. However, due to the provision of the ratchet function as described above, the impact or shock during the engagement can be suppressed.

Furthermore, a fluctuation in the ratchet minimum differential rotation speed is unavoidable due to a structure of the engagement mechanism 23. In other words, when the differential rotation speed of the SOWC 17 is close to the ratchet minimum differential rotation speed, there is a case where the SOWC 17 can be either locked or ratcheted. For this reason, as shown in FIG. 9, an upper limit and a lower limit are set for the ratchet minimum differential rotation speed in this lock rotation control. In other words, the ratchet minimum differential rotation speed has a specified differential rotation speed range between the upper limit of the ratchet minimum differential rotation speed and the lower limit of the ratchet minimum differential rotation speed. Then, when the differential rotation speed of the SOWC 17 is higher than the upper limit of the ratchet minimum differential rotation speed, the SOWC 17 is always ratcheted to prevent the engagement thereof. On the contrary, when the differential rotation speed of the SOWC 17 is lower than the lower limit of the ratchet minimum differential rotation speed, the SOWC 17 is always engaged.

If the lock rotation control is executed in step S7 and step S8, it is determined whether the differential rotation speed of the SOWC 17 is lower than engagement stop differential rotation speed (step S9). As shown in FIG. 9, this engagement stop differential rotation speed (the third differential rotation speed) is set as a value that is higher than the upper limit of the above ratchet minimum differential rotation speed. Accordingly, a negative determination is made in this step S9 if the differential rotation speed of the SOWC 17 is equal to or higher than the engagement stop differential rotation speed. In this case, the process proceeds to step S10, and engagement stop control for stopping a series of the synchronous control, which includes the above lock rotation control, is executed. Then, this routine is terminated once.

On the contrary, a positive determination is made in step S9 if the differential rotation speed of the SOWC 17 is lower than the engagement stop differential rotation speed. In this case, the process proceeds to step S11. Then, it is determined whether the differential rotation speed of the SOWC 17 is lower than retry differential rotation speed. As shown in FIG. 9, this retry differential rotation speed (the second differential rotation speed) is set as a value that is lower than the upper limit of the above ratchet minimum differential rotation speed and is also higher than the lower limit of the ratchet minimum differential rotation speed. Accordingly, when the differential rotation speed of the SOWC 17 is higher than this retry differential rotation speed, a possibility that the SOWC 17 is ratcheted and thus cannot be engaged is increased. Thus, a negative determination is made in this step S11 if the differential rotation speed of the SOWC 17 is equal to or higher than this retry differential rotation speed. In this case, the process returns to step S2, and the above-described synchronous control is executed again. In other words, the differential rotation speed of the SOWC 17 becomes the unlock-side target differential rotation speed on the negative side again, and the series of the control from the synchronous control in step S2 onward is executed again. That is, the above-described unlock rotation control and lock rotation control are executed again.

Noted that, in the case where the differential rotation speed of the SOWC 17 is equal to or higher than the retry differential rotation speed as described above, only the lock rotation control can be executed without executing the unlock rotation control again. More specifically, the differential rotation speed of the SOWC 17 is once reduced to be a specified value that is lower than the retry differential rotation speed and the lock-side target differential rotation speed. In this case, the differential rotation speed is reduced within a positive range. Then, the lock rotation control is executed again. With such a control, compared to a case where the control including the unlock rotation control is executed again as in the above example, time required for the engagement of the SOWC 17 can be shortened, and thus the responsiveness of the control can be improved.

On the contrary, a positive determination is made in this step S11 if the differential rotation speed of the SOWC 17 is lower than this retry differential rotation speed. In this case, the process proceeds to step S12. Then, it is determined whether the differential rotation speed of the SOWC 17 becomes substantially zero. In other words, it is determined in this step S12 whether the SOWC 17 has become engaged. It can be determined that the SOWC 17 has become engaged, in the case where the differential rotation speed of the SOWC 17 that is maintained at the lock-side target differential rotation speed becomes substantially zero. Accordingly, a negative determination is made in this step S12 if the differential rotation speed of the SOWC 17 has not become substantially zero. In this case, the process returns to step S8, and the lock rotation control, in which the differential rotation speed of the SOWC 17 becomes and is maintained at the lock-side target differential rotation speed, is continued.

On the contrary, a positive determination is made in step S12 if the differential rotation speed of the SOWC 17 has become substantially zero, that is, if it is determined that the SOWC 17 has become engaged. In this case, the process proceeds to step S13. Then, transition of torque from the first motor 2 to the SOWC 17 is initiated. More specifically, the first motor 2 is controlled such that the output torque thereof becomes zero. For example, in the example of the configuration shown in FIG. 1, the output torque of the first motor 2 becomes zero in a state that the rotation of the first motor 2 and the rotation of the sun gear 5 are locked by the SOWC 17. Alternatively, in the example of the configuration shown in FIG. 3, the output torque of the first motor 2 becomes zero in a state that the rotation of the ring gear 22 in the overdrive mechanism 19 is locked by the SOWC 17. Then, this routine is terminated once.

A time chart in FIG. 9 shows an example of the change in the differential rotation speed of the SOWC 17 when the above control shown in the flowchart in FIG. 7 is executed. Once a determination for switching the SOWC 17 to the engaged state is established in a state that the vehicle Ve travels in the disengaged state of the SOWC 17 (time t1), the above-described synchronous control is initiated. Then, the rotation of the first motor 2 is controlled such that the differential rotation speed of the SOWC 17 is reduced to the negative side (time t2).

The differential rotation speed of the SOWC 17 is gradually reduced to the negative side and eventually reaches the actuator ON differential rotation speed, which is set as a specified value close to zero. At this time, the actuator 32 is controlled to be ON (time t3). Thereafter, once it is detected by the detection signal of the stroke sensor 33 or the like that the stroke of the actuator 32 is completed (time t4), a timer is actuated. Then, the lock rotation control is initiated at a time point (time t5) when a specified time period has elapsed since the completion of the stroke of the actuator 32 is detected. The specified time period set here is a time period that is estimated as time required for the operation of the actuator 32 to be completed and for the strut 26 to move to the specified position for engagement, as described above.

Meanwhile, while the operation of the actuator 32 is controlled as described above, the differential rotation speed of the SOWC 17 is gradually reduced to the unlock-side target differential rotation speed that is set on the negative side. Then, once the differential rotation speed of the SOWC 17 becomes the unlock-side target differential rotation speed, the rotation of the first motor 2 is subject to feedback control such that the differential rotation speed is maintained at the unlock-side target differential rotation speed. In other words, the unlock rotation control is executed. This unlock rotation control is continued until the above time t5, that is, until a time point when the completion of the stroke of the actuator 32 is estimated. Accordingly, the operation of the strut 26 for the engagement of the SOWC 17 is always performed in the state that the differential rotation speed of the SOWC 17 is negative. Thus, the strut 26 can be operated from the second clutch plate 25 of the SOWC 17 without being applied with the torque. As a result, such a situation that the strut 26 and the pocket 29 are engaged at an improper position that is located in a middle of a path for the strut 26 to be engaged at a specified position in the pocket 29 can be avoided.

Once the lock rotation control is initiated at the time t5, the rotation of the first motor 2 is controlled such that the differential rotation speed of the SOWC 17 is increased to the lock-side target differential rotation speed that is set on the positive side. Then, once the differential rotation speed of the SOWC 17 becomes the lock-side target differential rotation speed, the rotation of the first motor 2 is subject to feedback control such that the differential rotation speed is maintained at the lock-side target differential rotation speed. In other words, the lock rotation control is executed. As described above, the lock-side target differential rotation speed is set as the value on the positive side that is lower than the lower limit of the ratchet minimum differential rotation speed at which the SOWC 17 is always engaged. For this reason, the SOWC 17 can be smoothly shifted to the engaged state in the state that the differential rotation speed thereof is maintained at the lock-side target differential rotation speed.

Then, the engagement of the SOWC 17 is completed, and thus the differential rotation speed of the SOWC 17 becomes zero (time t6). Accordingly, it can be determined that the engagement of the SOWC 17 is completed by monitoring the change of the differential rotation speed of the SOWC 17. Once it is determined that the engagement of the SOWC 17 is completed, just as described, the torque transition from the first motor 2 to the SOWC 17 is initiated (time t7). More specifically, the first motor 2 is controlled such that the output torque thereof becomes zero.

As it has been described specifically so far, according to the control device of the invention, in the case where the SOWC 17, the differential rotation speed of which is positive, is switched from the disengaged state to the engaged state, the actuation mechanism 27 is actuated such that the strut 26 can be projected at the position between the first clutch plate 24 and the second clutch plate 25 where the strut 26 is engaged. Then, the differential rotation speed of the SOWC 17 is maintained at the lock-side target differential rotation speed on the positive side. When the differential rotation speed is positive, the torque can be transmitted between the first clutch plate 24 and the second clutch plate 25. Accordingly, when a part of the strut 26 is engaged with the pocket 29 of the second clutch plate 25 in a state that the differential rotation speed is maintained at the lock-side target differential rotation speed on the positive side, the torque is transmitted between the first clutch plate 24 and the second clutch plate 25. In other words, the SOWC 17 is brought into the engaged state. Accordingly, the SOWC 17 can be brought into the engaged state by engaging the part of the strut 26 with the pocket 29 at the desired and appropriate differential rotation speed. For example, when the selectable one-way clutch is engaged with a low differential rotation speed, the inertia torque and the impact force during the engagement can be suppressed. In addition, since the differential rotation speed is not increased substantially, the time required for the engagement can be shortened. Thus, the SOWC 17 in the disengaged state can appropriately and reliably be switched to the engaged state.

Figure 10:
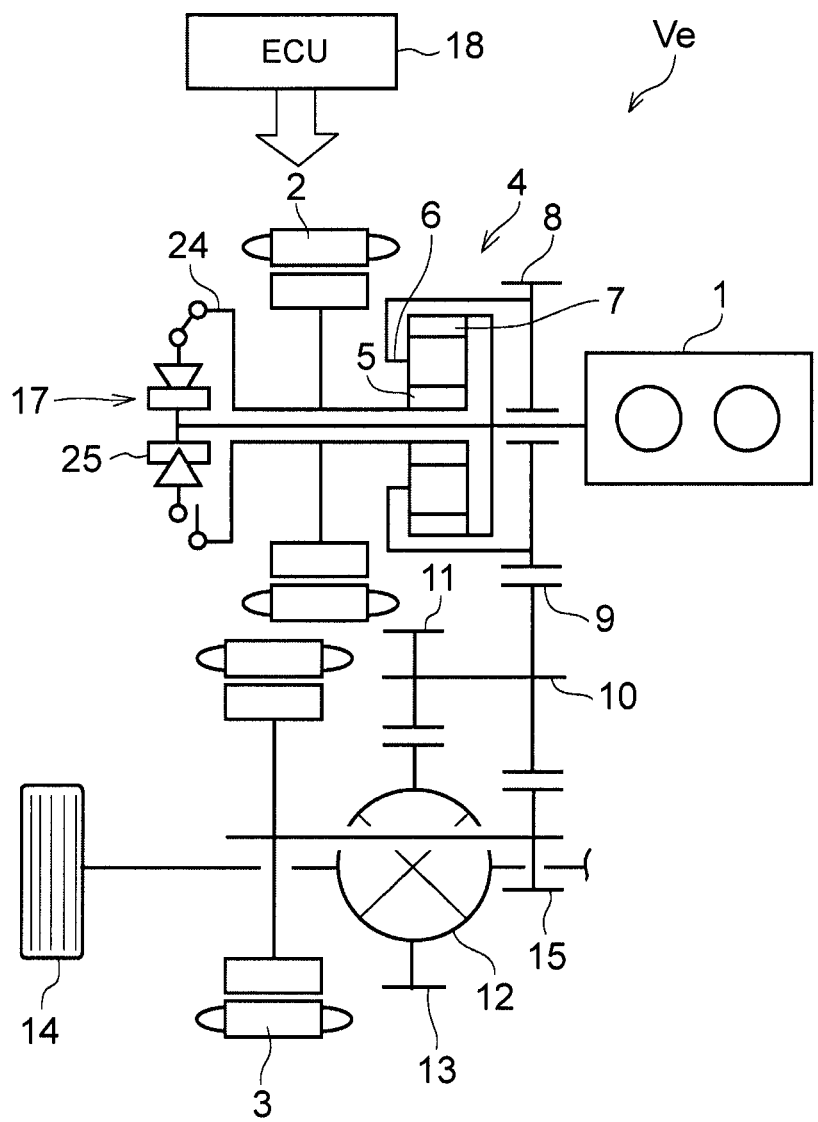
FIG. 10 is a view of yet another example of the configuration of the power transmission mechanism in the hybrid vehicle to which the invention is applied.

In the above-described specific example, the configuration in which the SOWC 17 is used as a brake for selectively stopping the rotation of the sun gear 5 or the ring gear 22 is described. Meanwhile, in this embodiment, the SOWC 17 can also be configured such that it is used as a clutch for selectively transmitting the torque between the two rotary members. Such an example is shown in FIG. 10. A part of the configuration shown in FIG. 1, which is described above, is modified for this example of the configuration shown in FIG. 10. More specifically, instead of the engine 1, the output gear 8 is coupled to the carrier 6 in the planetary gear mechanism, which constitutes the power split mechanism 4. In addition, instead of the output gear 8, the engine 1 is coupled to the ring gear 7. Furthermore, the SOWC 17 shown in this FIG. 10 is configured to selectively couple the ring gear 7 (the engine 1) and the sun gear 5. A direction of engagement of the SOWC 17 in this case is a direction in which the torque is transmitted from the engine 1 to the sun gear 5 in the positive rotational direction. The rest of the configuration is the same as the configuration shown in FIG. 1. Accordingly, components shown in this FIG. 10 are denoted by the same reference numerals as those used in FIG. 1, and the description thereof will not be made.

In the power transmission mechanism that is configured as shown in FIG. 10, the HV mode (or the power split mode)

and a direct connection mode (or the parallel mode) can be set. In the HV mode, the power output by the engine 1 is divided by the output gear 8 and the first motor 2. In the direct connection mode, a differential action of the power split mechanism 4 is stopped, and the entire power split mechanism 4 is integrated for rotation. The SOWC 17 shown in this FIG. 10 is engaged when the vehicle Ve travels forward in the above direct connection mode.

Figure 11:
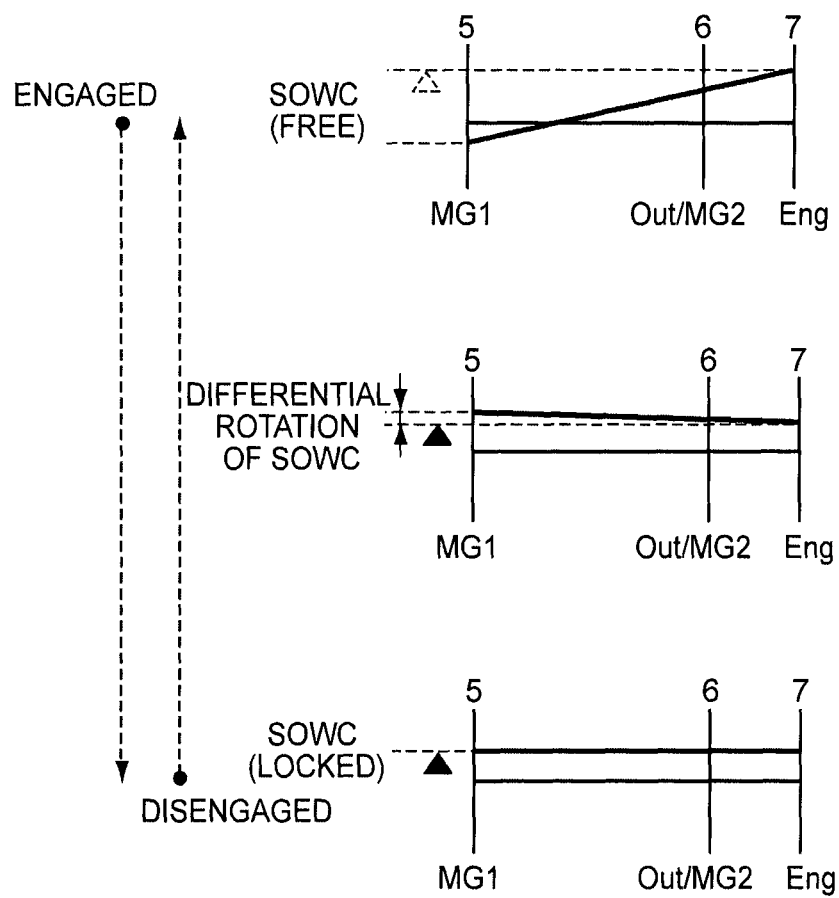
FIG. 11 includes collinear diagrams on the planetary gear mechanism that constitutes the power split mechanism in the hybrid vehicle shown in FIG. 10.

FIG. 11 includes collinear diagrams on the planetary gear mechanism that constitutes the power split mechanism 4 shown in FIG. 10. A top diagram in FIG. 11 indicates a state that the vehicle Ve travels forward in the HV mode with the SOWC 17 being disengaged. In this state shown in the top diagram in FIG. 11, the torque in the positive rotational direction of the engine 1 is transmitted to the ring gear 7. Meanwhile, reaction torque in the reverse rotational direction that is generated in conjunction with the travel of the vehicle Ve acts on the carrier 6. Accordingly, the torque in the reverse rotational direction acts on the sun gear 5. This corresponds to the torque in the positive rotational direction of the engine 1 with respect to the sun gear 5. However, since the SOWC 17 is disengaged, the sun gear 5 rotates reversely as shown in the top diagram in FIG. 11, for example. In this case, the first motor 2 that is coupled to the sun gear 5 functions as the electrical power generator and applies the torque in the positive rotational direction (the upward direction in the top diagram in FIG. 11) as the reaction force to the sun gear 5. As a result, the torque of the engine 1 is amplified and transmitted to the output gear 8, which is coupled to the carrier 6. In addition, the first motor 2 controls the speed of the engine 1 to a speed at which the excellent fuel efficiency can be realized. Furthermore, the electrical power generated in the first motor 2 is supplied to the second motor 3. Then, the second motor 3 functions as the motor. In other words, some of the power of the engine 1 that has been converted to the electrical power is converted to the mechanical power again, and is transmitted to the drive wheels 14.

A second diagram from the top in FIG. 11 indicates a transient state (a transition state) in which the SOWC 17 is switched between the state shown in the above top diagram in FIG. 11 and a state shown in the third diagram from the top in FIG. 11, which will be described below. In other words, the second diagram from the top in FIG. 11 indicates the transient state when the SOWC 17 is switched from the disengaged state (free) to the engaged state (locked) in which the SOWC 17 restricts the relative rotation between the sun gear 5 and the engine 1. In this state shown in the second diagram from the top in FIG. 11, the first motor 2 functions as the motor and rotates the sun gear 5 in the positive rotational direction. At this time, the rotational speed of the sun gear 5 exceeds the speed of the engine 1. In other words, the first motor 2 is controlled such that the engine 1 rotates in a reverse rotational direction (the negative rotation) relative to the sun gear 5. Such relative rotation corresponds to the differential rotation in the invention, and in this state shown in the second diagram from the top in FIG. 11, the negative differential rotation is produced. In other words, the SOWC 17 does not transmit the torque. Thus, when the engagement control of the SOWC 17 is executed in this state, the torque is not applied to the strut 26 of the SOWC 17. Noted that, in the state shown in the second diagram from the top, the direction of the differential rotation, the direction of the torque of the first motor 2, and the rotational direction of the first motor 2 are opposite from those in the example shown in the collinear diagrams of above-described FIG. 2 and FIG. 4. However, as described above, the SOWC 17 shown in FIG. 10 is configured such that the differential rotation produced in the state shown in the second diagram from the top in FIG. 11 is the negative differential rotation. Accordingly, the same control as the control example shown in the flowchart of FIG. 7 is executed so that the SOWC 17 can reliably and appropriately be engaged.

A third diagram from the top in FIG. 11 indicates a state that the vehicle Ve travels forward in the direct connection mode. In the forward travel state, as described above, the torque in the direction to cause the reverse rotation of the sun gear 5 acts thereon, and the engine 1 attempts to rotate in the positive rotational direction relative to the sun gear 5. Accordingly, when the SOWC 17 is controlled to be in the engaged state, the above-described strut 26 is interposed (meshed) between the housing section 28 of the first clutch plate 24 and the pocket 29 of the second clutch plate 25, and thus the sun gear 5 and the engine 1 are coupled to rotate integrally in the positive rotational direction. As a result, since the two rotary elements are integrated, the entire power split mechanism 4 rotates integrally. In other words, the engine 1 is directly connected to the output gear 8.

Noted that, in the configuration shown in FIG. 10, the first motor 2 is coupled to the first clutch plate 24 of the SOWC 17, and the rotational speed of the first clutch plate 24 is controlled by the first motor 2. Meanwhile, in the above-described configuration shown in FIG. 1, the first motor 2 is coupled to the second clutch plate 25 of the SOWC 17, and the rotational speed of the second clutch plate 25 is controlled by the first motor 2. In addition, in the above-described configuration shown in FIG. 3, the first motor 2 is coupled to the second clutch plate 25 of the SOWC 17 via the overdrive mechanism 19, and the rotational speed of the second clutch plate 25 is controlled by the first motor 2. As described above, the first motor 2 is configured that it can control the rotational speed of either one clutch member of the first clutch plate 24 and the second clutch plate 25 of the SOWC 17, and is an example of the motor of the invention.

Furthermore, the invention can be applied to a control device for a power transmission mechanism that includes a stepped transmission or a continuously variable transmission other than the power transmission mechanism that is installed in the hybrid vehicle Ve as described above. Thus, the motor in the invention may be a motor for controlling the SOWC only.

The invention claimed is:

1. A control system for a vehicle,
the control system comprising:
a selectable one-way clutch including a first clutch member, a second clutch member, a strut, and a switching mechanism,
the first clutch member and the second clutch member configured to rotate relatively to each other,
at least a part of the strut configured to be operated such that the part of the strut is projected from a first clutch member side to a second clutch member side,
the switching mechanism configured to selectively set a first state and a second state, the first state being a state that the switching mechanism permits a projection of the strut to the second clutch member side, and the second state being a state that the switching mechanism inhibits the projection of the strut,
the selectable one-way clutch configured to be switched between an engaged state and a disengaged state, the engaged state being a state that restricts a relative rotation in either a positive rotational direction or a reverse rotational direction in the first state with engaging the part of the strut with a part of the second clutch member, and the disengaged state being a state that permits the relative rotation in both of the positive rotational direction and the reverse rotational direction in the second state without projecting the strut to the second clutch member side;

a motor configured to control a rotational speed of either a first rotary member or a second rotary member; and an electronic control unit configured to
 (i) produce differential rotation by controlling the rotational speed by the motor, the differential rotation including positive differential rotation and negative differential rotation, the positive differential rotation being the relative rotation in a direction in which the relative rotation is restricted in the engaged state, and the negative differential rotation being the relative rotation in a direction in which the relative rotation is permitted in the engaged state, and
 (ii) (1) set the first state, and (2) execute lock rotation control in which the differential rotation is maintained at a specified positive value of the positive differential rotation, when the electronic control unit switches the selectable one-way clutch from the disengaged state to the engaged state.

2. The control system according to claim 1, wherein
the selectable one-way clutch has a ratchet mechanism,
the ratchet mechanism is configured such that the part of the strut, which is projected to the second clutch member side, is operated so as not to be engaged with the part of the second clutch member when a differential rotation speed is equal to or higher than a first differential rotation speed on a positive side,
the ratchet mechanism is configured such that the part of the strut is operated so as to be engaged with the part of the second clutch member when the differential rotation speed is lower than the first differential rotation speed,
a first target differential rotation speed is set as a target value of the differential rotation speed for maintaining the differential rotation speed to be positive in the lock rotation control, and
the first target differential rotation speed is set as a value that is lower than the first differential rotation speed.

3. The control system according to claim 1, wherein
the electronic control unit is configured to (i) set the first state and execute unlock rotation control in which a differential rotation speed is once maintained to be negative, and (ii) then execute the lock rotation control, when the selectable one-way clutch is switched from the disengaged state to the engaged state.

4. The control system according to claim 3, wherein
a second target differential rotation speed is set as a target value of the differential rotation speed for once maintaining the differential rotation speed to be negative in the unlock rotation control, and
the electronic control unit is configured to control the motor such that the speed of the differential rotation is maintained at the second target differential rotation speed until the first state is set and the part of the strut is projected to the second clutch member side.

5. The control system according to claim 1, wherein
a second differential rotation speed is set as a threshold on a positive side for maintaining the differential rotation speed to be positive in the lock rotation control, and
the electronic control unit is configured to execute unlock rotation control in which the differential rotation speed is once maintained to be negative and then execute the lock rotation control again, when the differential rotation speed becomes equal to or higher than the second differential rotation speed during execution of the lock rotation control.

6. The control system according to claim 1, wherein
a second differential rotation speed is set as a threshold on a positive side for maintaining the differential rotation speed to be positive in the lock rotation control, and
the electronic control unit is configured to reduce the differential rotation speed once and then execute the lock rotation control again, when the differential rotation speed becomes equal to or higher than the second differential rotation speed during execution of the lock rotation control.

7. The control system according to claim 1, wherein
the selectable one-way clutch has a ratchet mechanism,
the ratchet mechanism is configured such that the part of the strut, which is projected to the second clutch member side, is operated so as not to be engaged with the part of the second clutch member when a differential rotation speed is equal to or higher than a first differential rotation speed on a positive side,
the ratchet mechanism is configured such that the part of the strut is operated so as to be engaged with the part of the second clutch member when the differential rotation speed is lower than the first differential rotation speed,
a first target differential rotation speed is set as a target value of the differential rotation speed for maintaining the differential rotation speed to be positive in the lock rotation control,
the first target differential rotation speed is set as a value that is lower than the first differential rotation speed,
the first differential rotation speed has a specified differential rotation speed range between an upper limit of the first differential rotation speed and a lower limit of the first differential rotation speed,
the ratchet mechanism is configured such that the part of the strut is not engaged with the part of the second clutch member when the differential rotation speed is equal to or higher than the upper limit of the first differential rotation speed, and that the part of the strut is engaged with the part of the second clutch member when the differential rotation speed is equal to or lower than the lower limit of the first differential rotation speed, and
a second differential rotation speed is set as a value that is higher than the lower limit of the first differential rotation speed and that is lower than the upper limit of the first differential rotation speed.

8. The control system according to claim 1, wherein
a third differential rotation speed is set as an upper limit on a positive side for maintaining the differential rotation speed to be positive in the lock rotation control, and
the electronic control unit is configured to stop the lock rotation control, when the differential rotation speed becomes equal to or higher than the third differential rotation speed during execution of the lock rotation control.

9. The control system according to claim 1, wherein
the selectable one-way clutch has a ratchet mechanism,
the ratchet mechanism is configured such that the part of the strut, which is projected to the second clutch member side, is operated so as not to be engaged with the part of the second clutch member when a differential rotation speed is equal to or higher than a first differential rotation speed on a positive side, the ratchet mechanism is configured such that the part of the strut is operated so as to be engaged with the part of the second clutch member when the differential rotation speed is lower than the first differential rotation speed, a first target differential rotation speed is set as a target value of the differential rotation speed for maintaining the differential rotation speed to be positive in the lock rotation control, the first target differential rotation speed is set as a value that is lower than the first differential rotation speed, the first differential rotation speed has a specified differential rotation speed range between an upper limit of the first differential rotation speed and a lower limit of the first differential rotation speed, the ratchet mechanism is configured such that the part of the strut is not engaged with the part of the second clutch member when the differential rotation speed is equal to or higher than the upper limit of the first differential rotation speed, and that the part of the strut is engaged with the part of the second clutch member when the differential rotation speed is equal to or lower than the lower limit of the first differential rotation speed, a second differential rotation speed is set as a value that is higher than the lower limit of the first differential rotation speed and that is lower than the upper limit of the first differential rotation speed, a third differential rotation speed is set as an upper limit on a positive side for maintaining the differential rotation speed to be positive in the lock rotation control, and the third differential rotation speed is set as a value that is higher than the upper limit of the first differential rotation speed.

10. The control system according to claim 1, wherein the electronic control unit is configured to determine that switching of the selectable one-way clutch to the engaged state is completed when the differential rotation speed is reduced to be equal to or lower than a specified value during execution of the lock rotation control.

11. The control system according to claim 1, wherein the vehicle has an internal combustion engine and a power transmission mechanism, the power transmission mechanism has a fixed section and a first differential mechanism, either the first clutch member or the second clutch member is coupled to the fixed section, the fixed section is configured not to rotate or move, the first differential mechanism has a first rotary element, a second rotary element, and a third rotary element, the first rotary element, the second rotary element, and the third rotary element are configured to perform a differential action with respect to each other, the internal combustion engine is coupled to the first rotary element, the motor and the other one of the first clutch member and the second clutch member are coupled to the second rotary element, and the third rotary element is configured to output torque.

12. The control system according to claim 1, wherein the vehicle has an internal combustion engine and a power transmission mechanism, the power transmission mechanism has a fixed section and a first differential mechanism, and a second differential mechanism, either one of the first clutch member and the second clutch member is coupled to the fixed section, the fixed section is configured not to rotate or move, the first differential mechanism has a first rotary element, a second rotary element, and a third rotary element, the first rotary element, the second rotary element, and the third rotary element are configured to perform a differential action with respect to each other, the internal combustion engine is coupled to the first rotary element, the motor is coupled to the second rotary element, the third rotary element is configured to output torque, the second differential mechanism has a fourth rotary element, a fifth rotary element, and a sixth rotary element, the fourth rotary element, the fifth rotary element, and the sixth rotary element are configured to perform the differential action with respect to each other, the first rotary element is coupled to the fourth rotary element, the second rotary element is coupled to the fifth rotary element, the other one of the first clutch member and the second clutch member is coupled to the sixth rotary element, and the fifth rotary element is configured to rotate in an opposite direction from the fourth rotary element by stopping a rotation of the sixth rotary element.

* * * * *